(12) United States Patent
Yang

(10) Patent No.: US 8,304,112 B2
(45) Date of Patent: Nov. 6, 2012

(54) ELECTRODE PLATE MULTI-END SIDES TO SINGLE END SIDE CURRENT COLLECTOR OF AN ELECTRICITY STORAGE/DISCHARGE DEVICE

(76) Inventor: Tai-Her Yang, Dzan-Hwa (TW)

( * ) Notice: Subject to any disclaimer, the term of this patent is extended or adjusted under 35 U.S.C. 154(b) by 894 days.

(21) Appl. No.: 12/292,916

(22) Filed: Dec. 1, 2008

(65) Prior Publication Data

US 2010/0136381 A1  Jun. 3, 2010

(51) Int. Cl.
*H01M 4/64* (2006.01)
*H01M 4/70* (2006.01)
*H01M 2/20* (2006.01)
*H01M 2/30* (2006.01)
*H01M 8/02* (2006.01)
*H01G 9/00* (2006.01)

(52) U.S. Cl. ........ 429/233; 429/149; 429/160; 429/161; 429/178; 429/239; 429/245; 429/517; 361/500

(58) Field of Classification Search .................. None
See application file for complete search history.

(56) References Cited

U.S. PATENT DOCUMENTS

| RE36,102 | E | * | 2/1999 | Dougherty | 429/160 |
| 6,806,679 | B2 | * | 10/2004 | Yang | 320/107 |
| 2005/0100791 | A1 | * | 5/2005 | Gyenge et al. | 429/236 |
| 2007/0193009 | A1 | * | 8/2007 | Vincze et al. | 29/2 |

* cited by examiner

*Primary Examiner* — Jonathan Crepeau
(74) *Attorney, Agent, or Firm* — Bacon & Thomas, PLLC

(57) ABSTRACT

The present invention discloses that the auxiliary electric conductor is additionally installed between the positive or negative electrode plates being installed at the edge inside the individual electrode cell having electrode plates and the electrode cell casing, and the insulator is further installed between the electrode plate and the auxiliary electric conductor thereby favoring currents of the current collecting terminals at multiple end sides of the electrode plates of the same polarity to be collected to the single end side current collecting terminal structure being used as the input/output interface terminal.

21 Claims, 16 Drawing Sheets

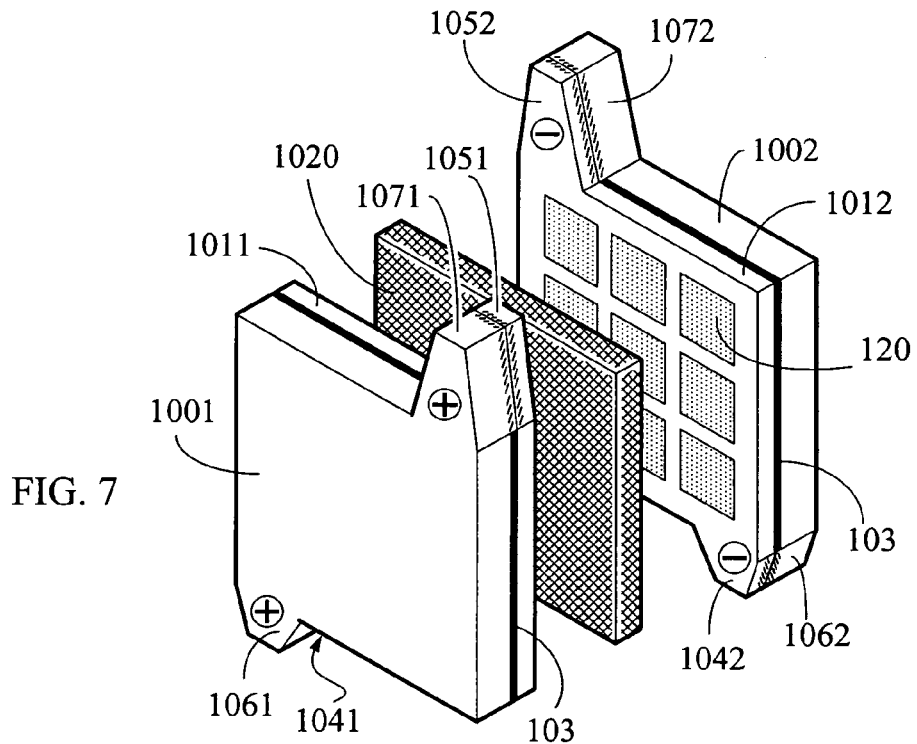
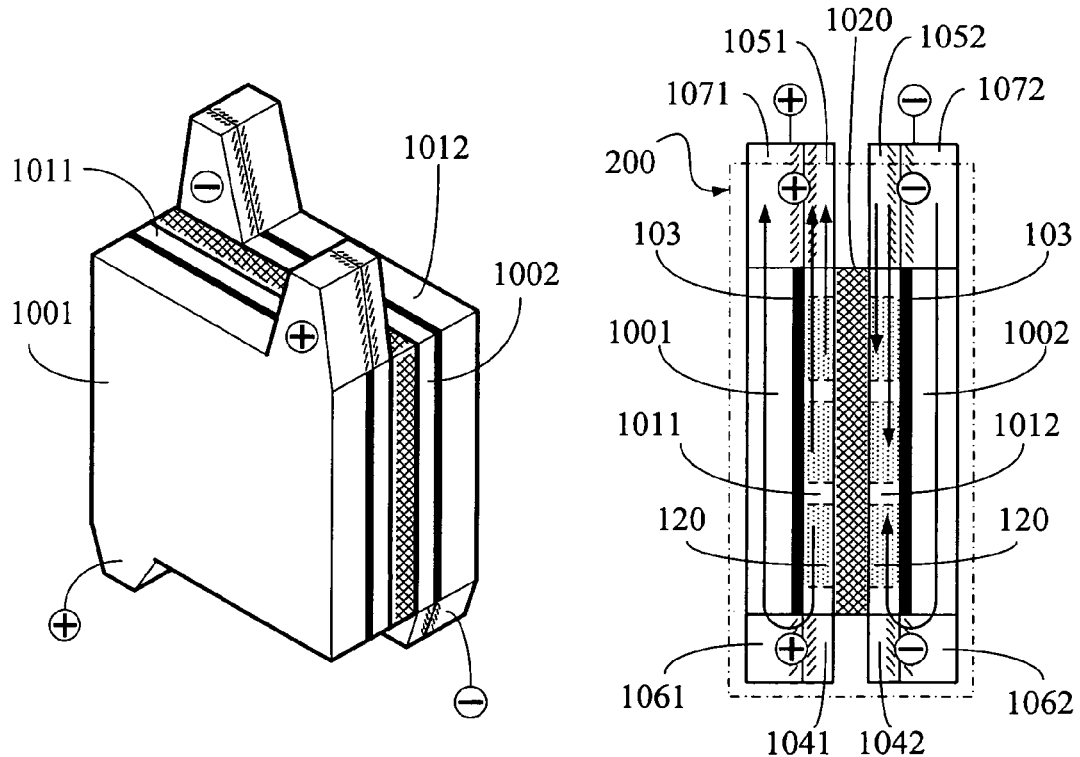
FIG. 7
FIG. 8
FIG. 9

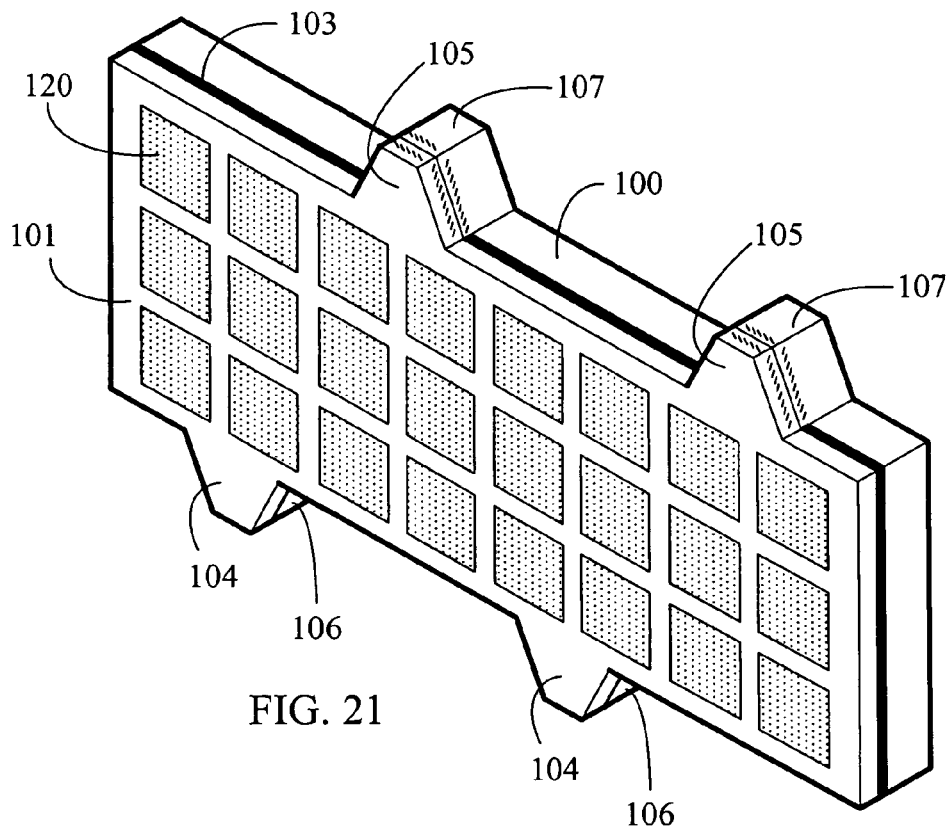
FIG. 21
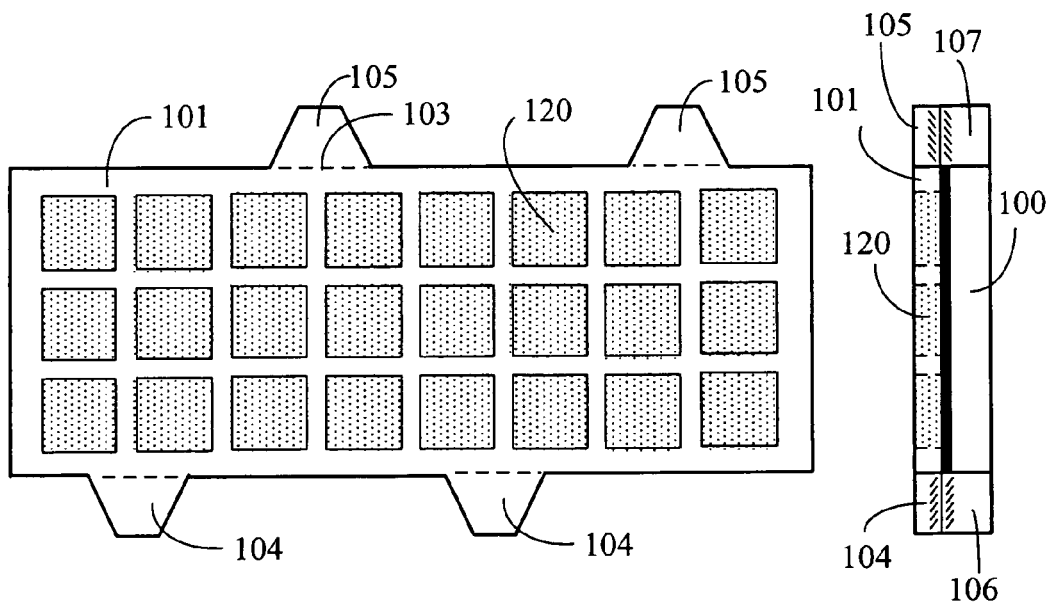
FIG. 22
FIG. 23

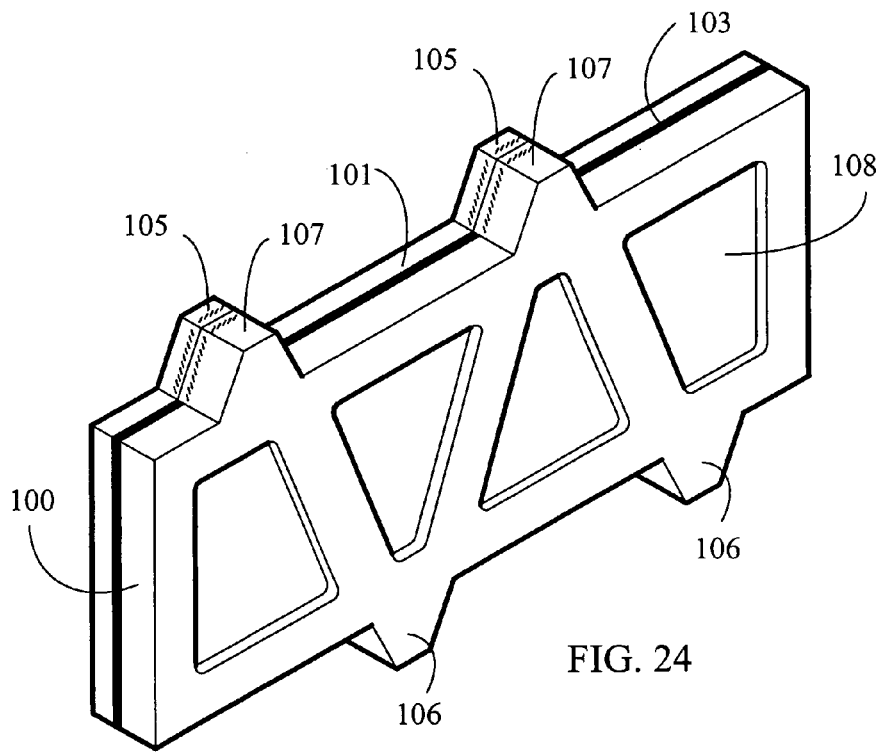
FIG. 24
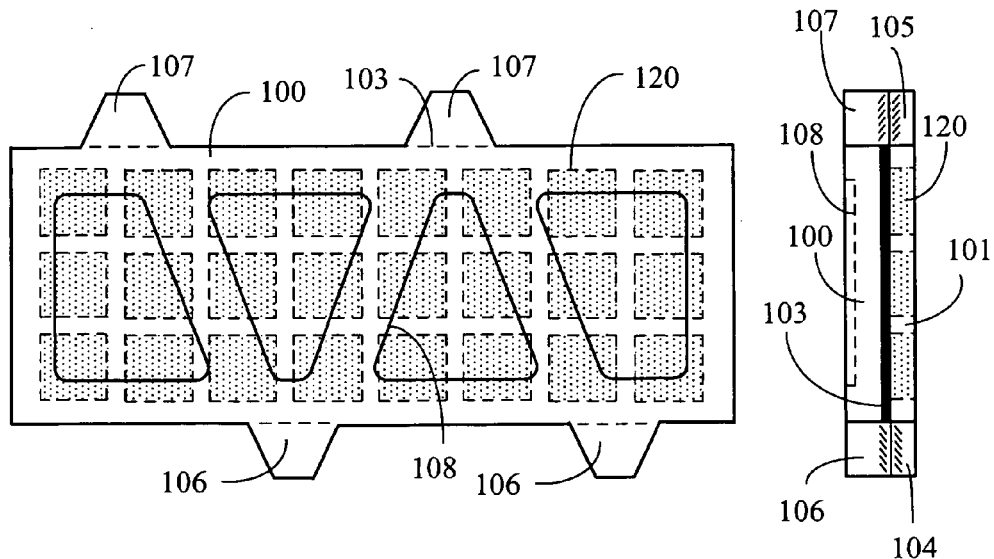
FIG. 25
FIG. 26

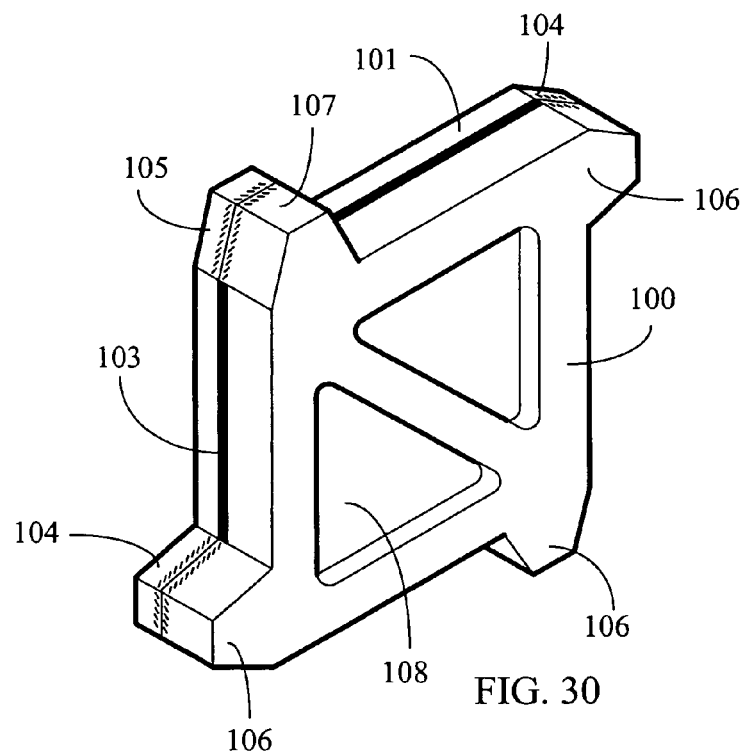
FIG. 30
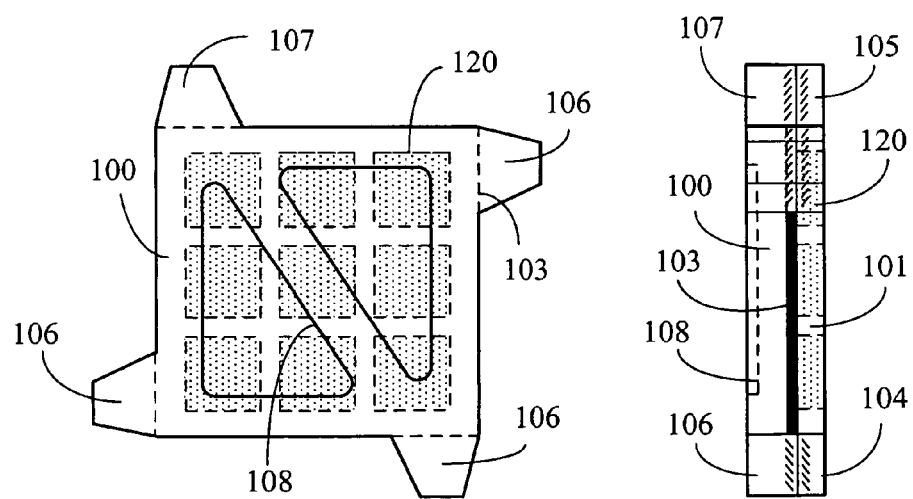
FIG. 31
FIG. 32

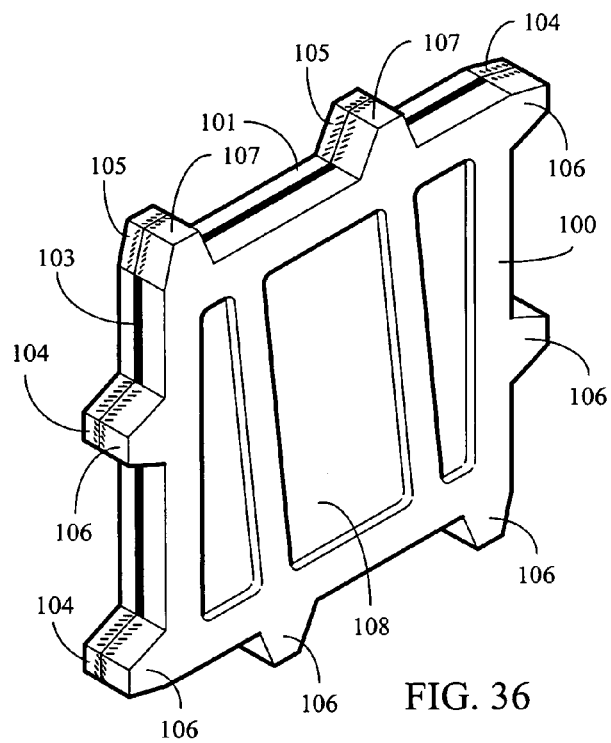
FIG. 36
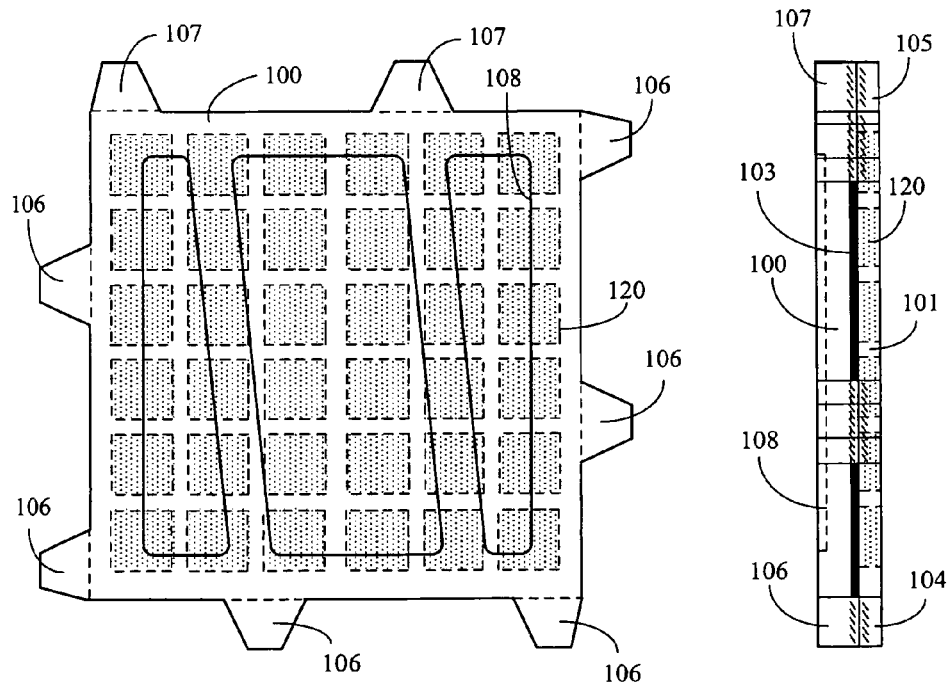
FIG. 37
FIG. 38

ELECTRODE PLATE MULTI-END SIDES TO SINGLE END SIDE CURRENT COLLECTOR OF AN ELECTRICITY STORAGE/DISCHARGE DEVICE

BACKGROUND OF THE INVENTION (a) Field of the Invention

The present invention discloses an improved multi-end sides to single end side input/output current collecting terminal structure being applied to the electrode plate of an electricity storage/discharge device for applications in electricity storage/discharge devices such as primary batteries, secondary chargeable/dischargeable batteries, capacitors, or super-capacitors, or fuel cell power supply device having electrode plates, wherein two or more than two end sides of each electrode plate of above said device are made with one or more than one current collecting terminal structure thereby allowing the electrode plate via multiple current collecting terminals on multi-sides to collect currents in multi-circuits, wherein the auxiliary electric conductor is additionally installed between the positive or negative electrode plate installed on end-side of individual electrode cell and the electrode cell casing, and the insulator is installed between the electrode plate and the auxiliary electric conductor thereby allowing current collecting terminals at different end-sides of the electrode plates in the same polarity to be connected via the auxiliary electric conductors to collect the currents of current collecting terminals at multiple end sides to the current collecting terminal at single end side to facilitate collecting input/output currents to the outside, wherein the number of external input/output current collecting terminals on the single end side of electrode plate can be one more than one.

(b) Description of the Prior Art

Conventional electricity storage/discharge devices such as various primary batteries, secondary chargeable/dischargeable batteries, capacitors, or super-capacitors are usually made with one or multiple current collecting terminals on the single end side thereof, such as that FIG. 1 is a schematic view showing the embodiment of the conventional electrode plate being made with one current collecting terminal on one end-side thereof, wherein one single end side of each electrode plate (P100) is made with a current collecting terminal (T100) to provide current collecting function for input or output current of the electrode plate, or to be used as the connection point for series connection or parallel connection with other electrode plates, however, as the electrode plate is only made with one current collecting terminal at the single end side thereof for output or input current, the current density of the electrode plate in case of large input or output current appears disproportionate phenomenon at the another end side of electrode plate and area farther away from current collecting terminal (T100) on the electrode plate; the more progressive one is that the electrode plate is made with two and more than two current collecting terminals on the same end side thereof thereby allowing the electrode plate to have two or more than two output or input current flow paths, and the two or more than two current collecting terminals being installed at the single end sides of electrode plates in the same polarities are further parallel connected through connecting the electric conductors; however, this method only improves the uniformity of input/output current density on the same end side, while the non-uniformity of input/output current density on the anther side of electrode plate remains unimproved.

Further, the electrode plate is improved by installing one or more than one individually outwardly extended current collecting terminal on the two or more than two end sides thereof, such as that FIG. 2 is a schematic view showing the embodiment of the electrode plate being made with a current collecting terminal respectively at two end-sides thereof; or one or more than one end side of the electrode plate (P100) is made with two or more than two current collecting terminals (T100) to constitute two or more than two input or output current paths thereby lowering internal resistances, such as that FIG. 3 shows an electrode plate being made with two current collecting terminals respectively at the two opposite end-sides; however, although input/output current uniformity is improved by the methods shown in FIG. 2 and FIG. 3, the external input/output terminals installed on the two end sides are still inconvenient for use.

SUMMARY OF THE INVENTION

Two or more than two end sides of the electrode plates applied in the electricity storage/discharge device are made with one or more than one current collecting terminal structure thereby allowing the electrode plate via multiple current collecting terminals on multi-sides to collect currents in multi-circuits, wherein the auxiliary electric conductor is additionally installed between the positive or negative electrode plate installed on end-side of the individual electrode cell and the electrode cell casing, and the insulator is installed between the electrode plate and the auxiliary electric conductor thereby allowing current collecting terminals at different end-sides of the electrode plates in the same polarity to be connected via the auxiliary electric conductors to collect the currents of current collecting terminals at multiple end sides to the current collecting terminal at single end side to facilitate collecting input/output currents to the outside, wherein the number of external input/output current collecting terminals on the single end side of electrode plate can be one more than one.

BRIEF DESCRIPTION OF THE DRAWINGS

FIG. 7 is a decomposed schematic view of the embodiment showing that the side positive electrode plate (1011) is combined with the positive auxiliary electric conductor (1001), and the side negative electrode plate (1012) is combined with negative auxiliary electric conductor (1002) thereby constituting the electrode pair of the electricity storage/discharge device.

FIG. 8 is an assembly schematic view of the embodiment showing the electrode pair to constitute the electricity storage/discharge device shown in FIG. 7.

FIG. 9 is a schematic view showing the electricity storage/discharge device constituted by the electrode pair shown in FIG. 8 being installed inside the casing (200) and the electric current flow path thereof.

FIG. 21 is a perspective structural schematic view of the present invention showing that an insulator is interposed between the side electrode plate being made with two current collecting terminals respectively at the two end-sides thereof and the flat plate type auxiliary electric conductor being respectively made with two current collecting terminals at the two end-sides thereof.

FIG. 22 is the front view of FIG. 21.

FIG. 23 is the side view of FIG. 21.

FIG. 24 is a perspective structural schematic view of the present invention showing that an insulator is interposed between the side electrode plate being made with two current collecting terminals respectively at the two end-sides thereof and the flat plate type auxiliary electric conductor with weight reducing concave holes being respectively made with two current collecting terminals at the two end-sides thereof.

FIG. 25 is the front view of FIG. 24.

FIG. 26 is the side view of FIG. 24.

FIG. 30 is a perspective structural schematic view of the present invention showing that an insulator is interposed between the side electrode plate being made with a current collecting terminal respectively at the four end-sides thereof and the flat plate type auxiliary electric conductor with weight reducing concave holes being respectively made with a current collecting terminals at the four end-sides thereof.

FIG. 31 is the front view of FIG. 30.

FIG. 32 is the side view of FIG. 30.

FIG. 36 is a perspective structural schematic view of the present invention showing that an insulator is interposed between the side electrode plate being made with two current collecting terminals respectively at the four end-sides thereof and the flat plate type auxiliary electric conductor with weight reducing concave holes being respectively made with two current collecting terminals at the four end-sides thereof.

FIG. 37 is the front view of FIG. 36.

FIG. 38 is the side view of FIG. 36.

DESCRIPTION OF MAIN COMPONENT SYMBOLS

Figure 1:
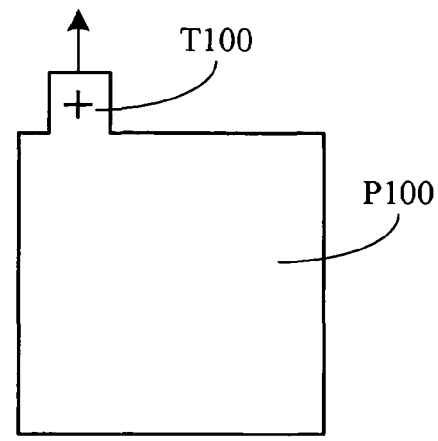
FIG. 1 is a schematic view showing the embodiment of the conventional electrode plate being made with one current collecting terminal on one end-side thereof.
Figure 2:
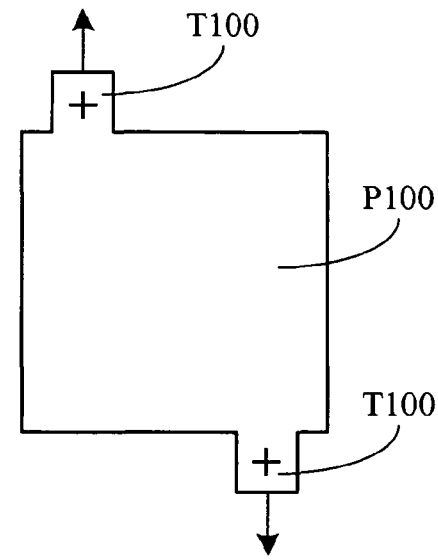
FIG. 2 is a schematic view showing the embodiment of the electrode plate being made with a current collecting terminal respectively at two end-sides thereof.
Figure 3:
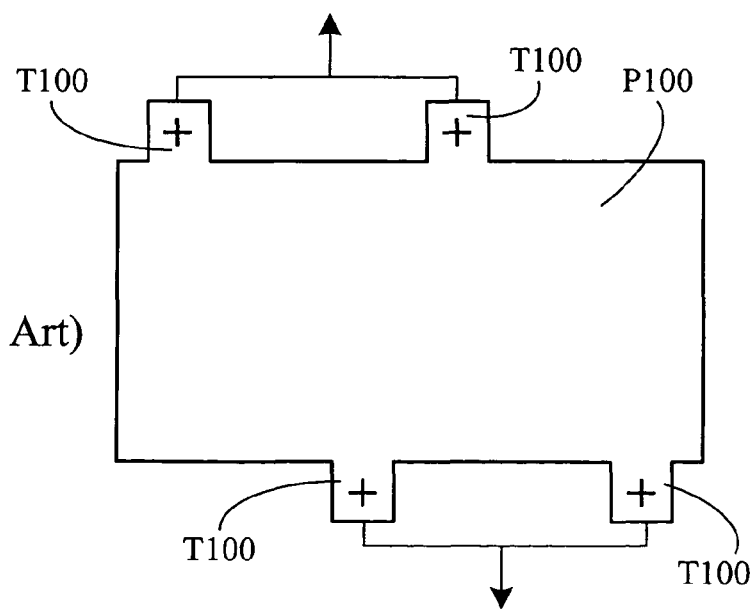
FIG. 3 shows an electrode plate being made with two current collecting terminals respectively at the two opposite end-sides.

P100: Electrode plate
T100: Current collecting terminal
100: Auxiliary electric conductor
101: Side electrode plate
103: Insulator

104, 106, 1041, 1042, 1061, 1062, 1081, 1091: current collecting terminal
105, 107, 1051, 1052, 1071, 1072: Input/output current collecting terminal
108: weight reducing concave hole
120: Active matter
200: Casing
1001: Positive auxiliary electric conductor
1002: Negative auxiliary electric conductor
1011: Side positive electrode plate
1012: Side negative electrode plate
1013: Middle positive electrode plate
1014: Middle negative electrode plate
1020: Isolating plate

DETAILED DESCRIPTION OF THE PREFERRED EMBODIMENTS

The present invention discloses an improved multi-end sides to single end side input/output current collecting terminal structure being applied to the electrode plate of an electricity storage/discharge device for applications in electricity storage/discharge devices such as primary batteries, secondary chargeable/dischargeable batteries, capacitors, or supercapacitors, or fuel cell power supply device having electrode plates, wherein two or more than two end sides of each electrode plate of above said device are made with one or more than one current collecting terminal structure thereby allowing the electrode plate via multiple current collecting terminals on multi-sides to collect currents in multi-circuits, wherein the auxiliary electric conductor is additionally installed between the positive or negative electrode plate installed on end-side of individual electrode cell and the electrode cell casing, and the insulator is installed between the electrode plate and the auxiliary electric conductor thereby allowing current collecting terminals at different endsides of the electrode plates in the same polarity to be connected via the auxiliary electric conductors to collect the currents of current collecting terminals at multiple end sides to the current collecting terminal at single end side to facilitate collecting input/output currents to the outside, wherein the number of external input/output current collecting terminals on the single end side of electrode plate can be one more than one.

The main constitution characteristics of the electrode plate multi-end sides to single end side current collector of an electricity storage/discharge device of the present invention are as following:

The individual electrode cell is provided for disposing a stack of electrode plates, wherein at where between the positive or negative electrode plate installed near the end-side of the electrode cell and the electrode cell casing is additionally installed with the auxiliary electric conductor, and the insulator is further interposed between said electrode plate and said auxiliary electric conductor, thereby the current collecting terminals at different end sides of the electrode plate in the same polarity are connected via the auxiliary electric conductor to collect currents from current collecting terminals at multiple end sides to the current collecting terminal at single end side for the current collecting terminal at single end side being used as the external input/output current collecting terminal, wherein the number of the external input/output current collecting terminal installed on the single end side can be one more than one;

The auxiliary electric conductor being in flat plate or bar shape, or multi-barred shape, or of flat plate type structure with concave holes (including through holes or blind holes), or of mesh type structure, or in other selected geometric shape and being made of selected electrically conductive material are used to connect current collecting terminals at different end sides of the side electrode plate thereby allowing currents of current collecting terminals at multiple end sides to be collected to the current collecting terminal at single end side for the current collecting terminal at single end side being used as the external input/output current collecting terminal, wherein the number of the external input/output current collecting terminals installed on the single end side can be one more than one;

The auxiliary electric conductor is installed between the end-side of the internal electrode cell and the side electrode plate and an insulator is further interposed between said auxiliary electric conductor and its attached side electrode plate; the auxiliary electric conductor and its attached side electrode plate are respectively disposed with output current collecting terminals at the at least end sides, wherein the combination methods between the output current collecting terminals of the two include welding, fusion joining, rivet fastening, lockingly combined by screw, or pressingly combined by prestress, internally buried, or embedment or other methods, or the auxiliary electric conductor and the side electrode plate are integrally made, or the auxiliary electric conductor and the side electrode plate are connectedly made to foil type and are further folded to combine the input/output current collecting terminals at the other end by above said welding, fusion joining, rivet fastening, lockingly combined by screw, or pressingly combined by prestress, internally buried, or embedment or other methods so as to electrically connect respective current collecting terminals at different end sides of the side electrode plate in the same electrode cell thereby allowing the currents of current collecting terminals at multiple end sides being collected to the current collecting terminal at single end side being connected and combined by the side electrode plate and the auxiliary electric conductor for the current collecting terminal at single end side being used as the external input/output current collecting terminal, wherein the number of external input/output current collecting terminal installed on the single end side of the side electrode plate and the auxiliary electric conductor can be one more than one;

The conductors for series connecting the input/output current collecting terminals of the electrode plates in different polarities in different electrode cells are further made of connected foil or bar type conductors by selected geometric shape and selected material;

The installation methods of the insulators interposed between the side electrode plate of the end-side of the electrode cell and the auxiliary electric conductor can be constituted by one or more than one method as following, include:

1) Both of the electrode cell casing as well as the insulator being interposed between the side electrode plate (101) and the auxiliary electric conductor (100) can be made of different insulation materials;

2) Both of the electrode cell casing as well as the insulator being interposed between the side electrode plate (101) and the auxiliary electric conductor (100) can be constituted by individual structures made of the same insulation materials;

3) The electrode cell casing as well as the insulator being interposed between the side electrode plate (101) and the auxiliary electric conductor (100) can be integrally constituted by the same insulation material;

4) The insulator interposed between the side electrode plate (101) and the auxiliary electric conductor (100) is constituted by the originally enclosed or further treated insulation layer on the surface of the electrode plate or the auxiliary electric conductor itself.

Figure 4:
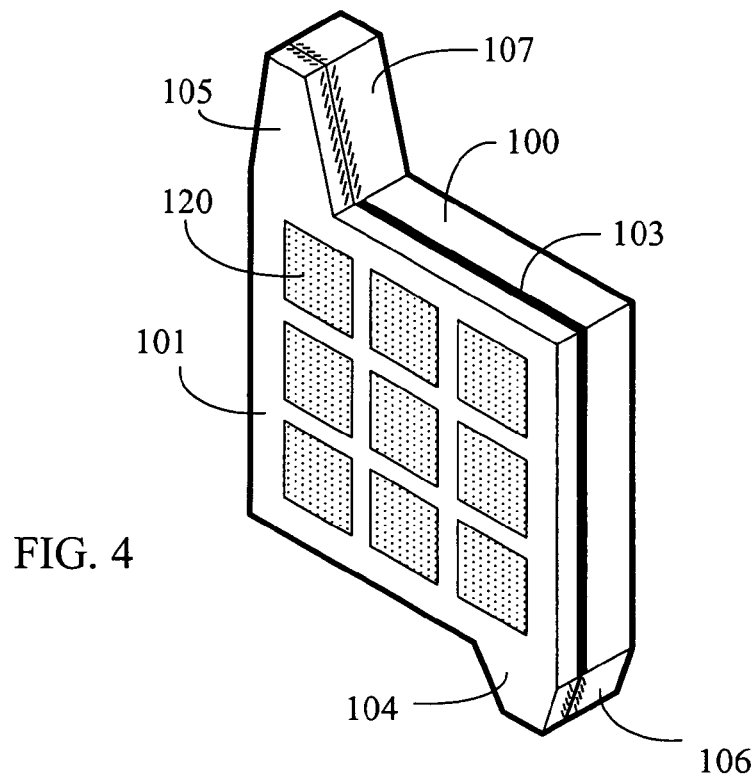
FIG. 4 is a perspective structural schematic view of the present invention showing that an insulator is installed between the side electrode plate being made with a current collecting terminal respectively at the two end-sides thereof and the flat plate type auxiliary electric conductor being respectively made with a current collecting terminal at the two end-sides thereof.

The electrode plate multi-end sides to single end side current collector of an electricity storage/discharge device of the present invention is further made by connecting electric conductors to connect the current collecting terminals of the individual electrode plates in the same voltage and the same polarity installed inside the same or different electrode cells for parallel connection, or to connect the current collecting terminals of electrode plates in opposite polarities installed inside different electrode cells for series connection or mixed series and parallel connection;

Aforesaid design concept can be applied in numerous adopted structural methods for practical requirements, wherein the structural types of flat plate type auxiliary electric conductors having said structural features are described in the following:

FIG. 4 is a perspective structural schematic view of the present invention showing that an insulator is installed between the side electrode plate being made with a current collecting terminal respectively at the two end-sides thereof and the flat plate type auxiliary electric conductor being respectively made with a current collecting terminal at the two end-sides thereof.

Figure 5:
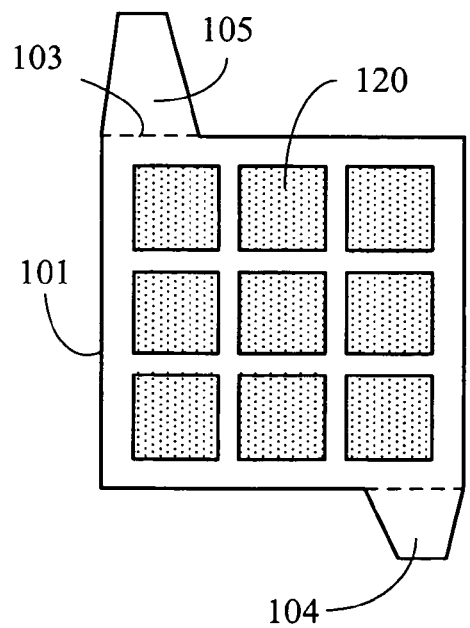
FIG. 5 is a front view of FIG. 4.
Figure 6:
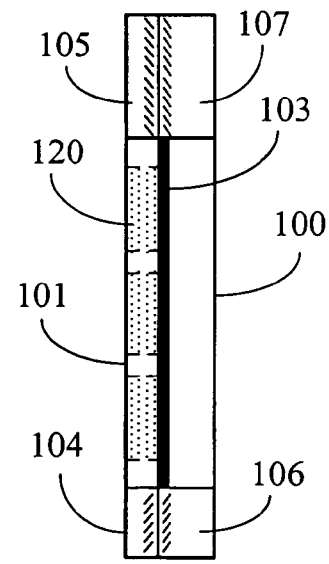
FIG. 6 is a side view of FIG. 4.

FIG. 5 is a front view of FIG. 4, and FIG. 6 is a side view of FIG. 4.

For the structure shown in aforesaid FIG. 4, FIG. 5 and FIG. 6, the constitution characteristics include:

The side electrode plate (101) is respectively made with a current collecting terminal at the two end-sides thereof;

An insulator (103) is installed between one side of the side electrode plate (101) and the additionally outside installed flat plate type auxiliary electric conductor (100), while the other side of the side electrode plate (101) has a lattice type space to install conventional active matter (102) used for generating electricity storage/discharge function;

The current collecting terminal (104) of the side electrode plate (101) and the current collecting terminal (106) of the auxiliary electric conductor (100) on the same end are parallel connected for electric conduction;

The input/output current collecting terminal (105) of the side electrode plate (101) is parallel connected with the current collecting terminal (107) of the auxiliary electric conductor (100) on the same end for electric conduction to constitute input/output current collecting function for common input or output currents.

The insulator (103) is interposed between aforesaid side electrode plate (101) and auxiliary electric conductor (100) which are parallel connected via current collecting terminals (104, 106) for electric conduction and are through the parallel connection between the input/output current collecting terminals (105, 106) for electric conduction thereby constituting the input/output current collecting function for common input or output currents to the outside.

Further, said current collecting terminals (104, 106) on the other end thereof not arranged for common input/output currents to the outside can also be not made in terminal structures but to directly parallel connect the side electrode plate (101) and the auxiliary electric conductor (100) at the positions equivalent to the positions of electric conducting structures of the current collecting terminal (104) and the current collecting terminal (106) for electric conduction.

The aforesaid side electrode plate (101) as shown in FIG. 4 further can be respectively used as the side positive electrode plate (1011) and the side negative electrode plate (1012) constituting the electricity storage/discharge device to form a positive and negative electrode pair, wherein:

The insulator (103) is interposed between the side positive electrode plate (1011) and the positive auxiliary electric conductor (1001), while the current collecting terminal (1041) of the side positive electrode plate (1011) and the current collecting terminal (1061) of the positive auxiliary electric conductor (1001) are parallel connected for electric conduction, as well as the input/output current collecting terminal (1051) of the side positive electrode plate (1011) and the input/output current collecting terminal (1071) of the positive auxiliary electric conductor (1001) are parallel connected for electric conduction thereby providing the input/output current function to the outside;

The insulator (103) is interposed between the side negative electrode plate (1012) and the negative auxiliary electric conductor (1002), while the current collecting terminal (1042) of the side negative electrode plate (1012) and the current collecting terminal (1062) of the negative auxiliary electric conductor (1002) are parallel connected for electric conduction, as well as the input/output current collecting terminal (1052) of the side negative electrode plate (1012) and the input/output current collecting terminal (1072) of the negative auxiliary electric conductor (1002) are parallel connected for electric conduction thereby providing the input/output current function to the outside;

The separator plate (1020) is interposed between aforesaid side positive electrode plate (1011) and side negative electrode plate (1012);

The joined surfaces of aforesaid side positive electrode plate (1011) and side negative electrode plate (1012) for joining the separator plate (1020) has a lattice type space to install conventional active matter (102) used for generating electricity storage/discharge function;

FIG. 7 is a decomposed schematic view of the embodiment showing that the side positive electrode plate (1011) is combined with the positive auxiliary electric conductor (1001), and the side negative electrode plate (1012) is combined with the negative auxiliary electric conductor (1002) thereby constituting the electrode pair of the electricity storage/discharge device;

FIG. 8 is an assembly schematic view of the embodiment showing the electrode pair to constitute the electricity storage/discharge device shown in FIG. 7;

FIG. 9 is a schematic view showing the electricity storage/discharge device constituted by the electrode pair shown in FIG. 8 being installed inside the casing (200) and the electric current flow path thereof.

As shown in FIG. 9, the casing (200) is used for constituting the casing of the electricity storage/discharge device and is made of insulation material, wherein it can be optionally made to required structural shapes as needed.

Figure 10:
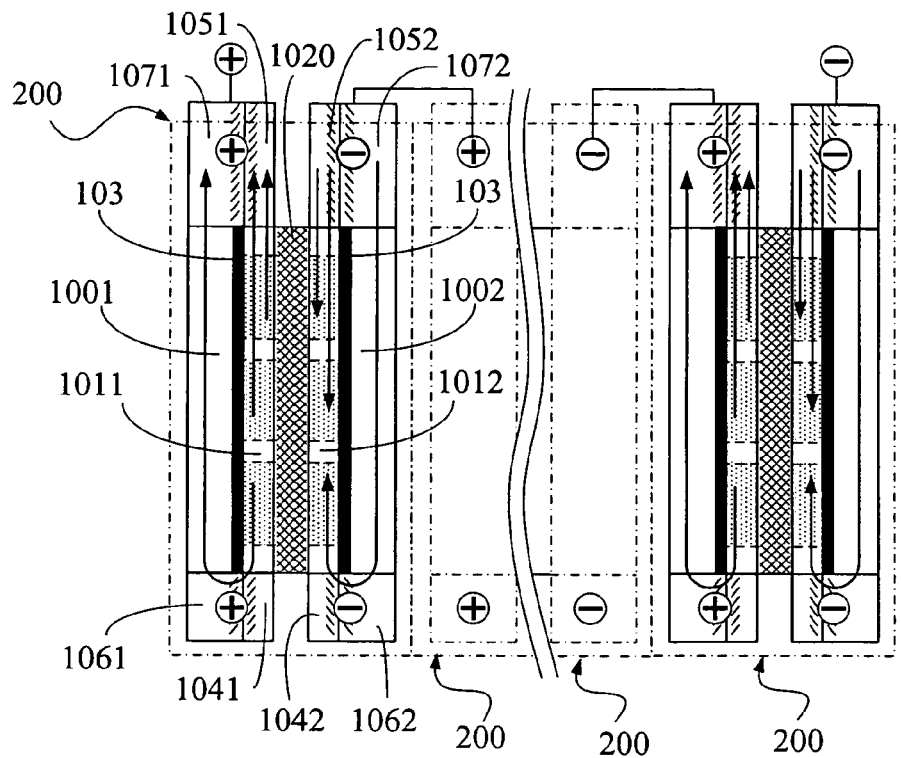
FIG. 10 shows the embodiment and the electric current flow path of multiple electricity storage/discharge devices as shown in FIG. 9 being series connected outside the casing.

FIG. 10 shows the embodiment and the electric current flow path of multiple electricity storage/discharge devices as shown in FIG. 9 being series connected outside the casing;

As shown in FIG. 10, the electrode cell with two or more than two individual casings (200) is arranged for individually housing a stack of electrode plates including housing the side positive electrode plate (1011) and the side negative electrode plate (1012), wherein:

The insulator (103) is interposed between the side positive electrode plate (1011) and the positive auxiliary electric conductor (1001) as well as interposed between the side negative electrode plate (1012) and the negative auxiliary electric conductor (1002); the external input/output positive current collecting terminals and the external input/output negative current collecting terminals in the individual electrode cells are series connected in forward polarities for input/output currents to the outside.

Figure 11:
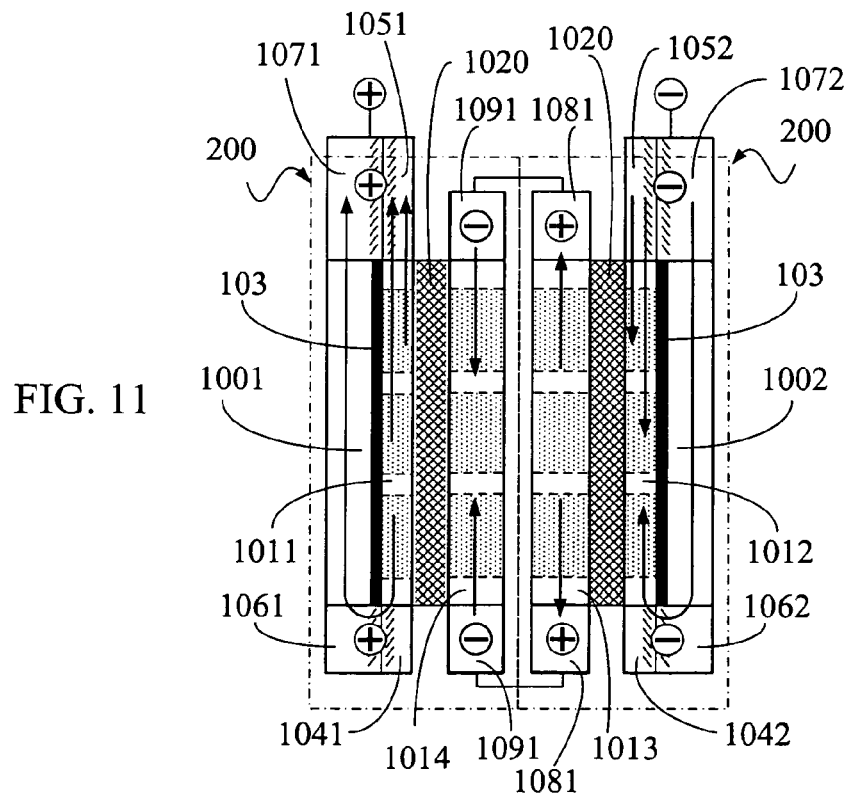
FIG. 11 shows the embodiment and the electric current flow path of multiple electricity storage/discharge devices as shown in FIG. 9 being series connected inside the casing.

FIG. 11 shows the embodiment and the electric current flow path of multiple electricity storage/discharge devices as shown in FIG. 9 being series connected inside the casing;

As shown in FIG. 11, it is constituted of that:

In the electrode cell with an integrated casing (200) for housing the positive input/output current collecting terminals, the insulator (103) is interposed between the side positive electrode plate (1011) and the positive auxiliary electric conductor (1001), wherein the positive input/output current collecting terminals (1071, 1051) of the two are connected for electric conduction in common to provide input/output currents to the outside;

Regarding the electrode cell with an integrated casing (200) for housing the negative input/output current collecting terminals, the insulator (103) is interposed between the side negative electrode plate (1012) and the negative auxiliary electric conductor (1002), wherein the negative input/output current collecting terminals (1072, 1052) of the two are connected for electric conduction to provide input/output currents to the outside.

Said side positive electrode plate (1011) and side negative electrode plate (1012) are respectively installed at the end side of the individual electrode cells inside an integrated casing (200), and the side positive electrode plate (1011) is attached to the separately installed middle negative electrode plate (1014) via a separator plate (1020) in the same electrode cell, while the side negative electrode plate (1012) is attached to the middle positive electrode plate (1013) via a separator plate (1020) in another electrode cell, thereby the current collecting terminals (1081) at two end-sides of the middle positive electrode plate (1013) in one electrode cell and the current collecting terminals (1091) at the two end-sides of the middle negative electrode plate (1014) in another electrode cell are series connected for electric conduction.

Figure 12:
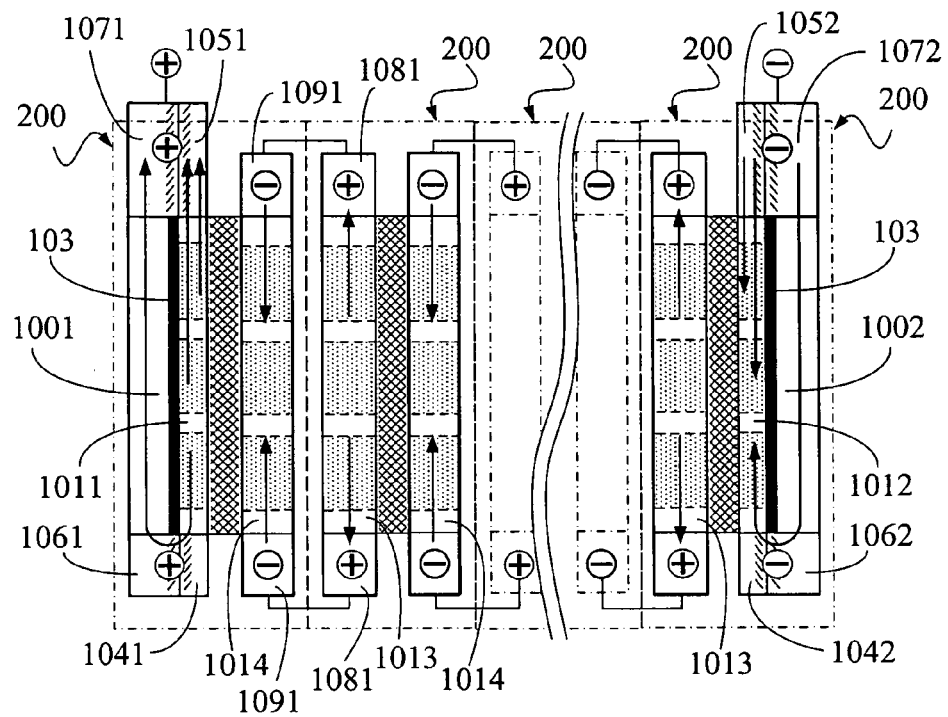
FIG. 12 shows the embodiment and the electric current flow path of the multiple electricity storage/discharge devices as shown in FIG. 11 being installed with the middle electrode cells constituted by the middle positive electrode plate (1013) and the middle negative electrode plate (1014) to be commonly series connected.

FIG. 12 shows the embodiment and the electric current flow path of the multiple electricity storage/discharge devices as shown in FIG. 11 being installed with the middle electrode cells constituted by the middle positive electrode plate (1013) and the middle negative electrode plate (1014) to be commonly series connected;

As shown in FIG. 12, individual middle electrode cells are further series connected between the electrode cell having the side positive electrode plate (1011) and the middle negative electrode plate (1014), and the electrode cell having the side negative electrode plate (1012) and the middle positive electrode plate (1013), wherein the middle electrode cell is installed with the middle positive electrode plate (1013) and the middle negative electrode plate (1014), while the current collecting terminals (1081) at the two end-sides of the middle positive electrode plate (1013), and the current collecting terminals (1091) at the two end-sides of the middle negative electrode plate (1014) in the same middle electrode cell are respectively series connected with the current collecting terminals (1081) at the two end-sides of the middle positive electrode plate (1013) and the current collecting terminals (1091) at the two end-sides of the middle negative electrode plate (1014) in different polarities in neighboring electrode cell for electric conduction, wherein the insulators (103) are respectively interposed between the side positive electrode plate (1011) and the positive auxiliary electric conductor (1001), and between the side negative electrode plate (1012) and the negative auxiliary electric conductor (1002), while the external positive input/output current collecting terminals and the external negative input/output current collecting terminals in the individual electrode cells provide input/output current to the outside.

Figure 13:
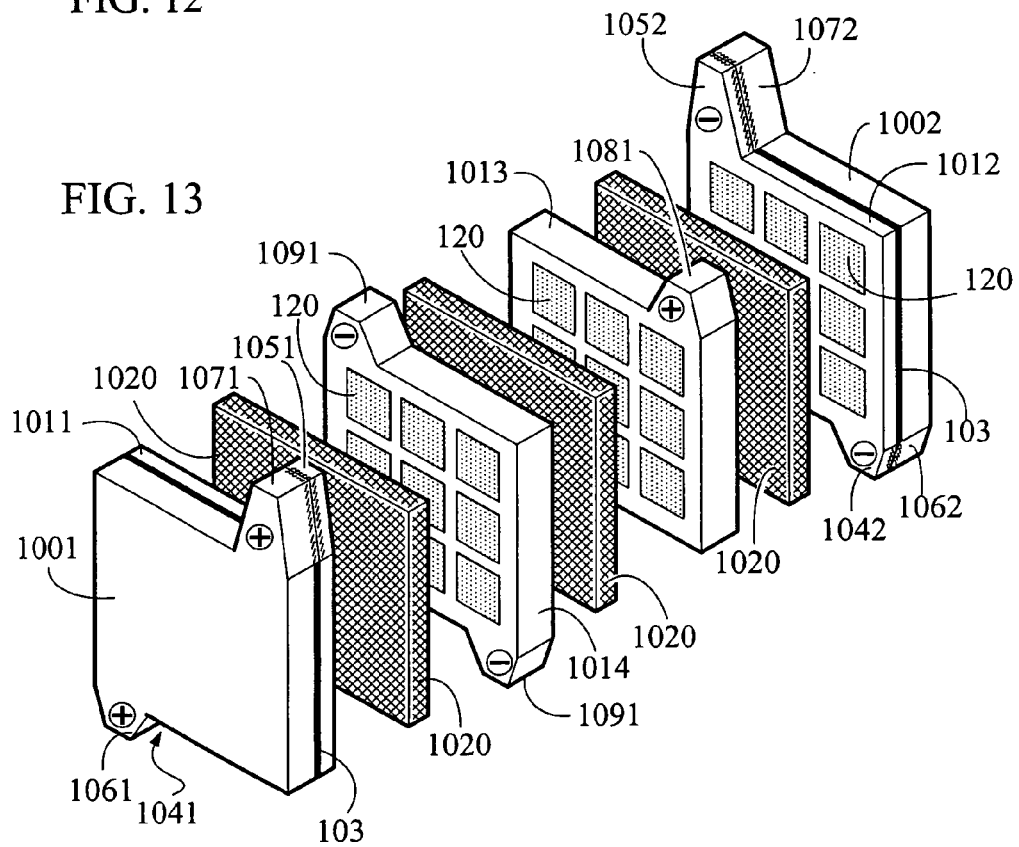
FIG. 13 is a decomposed schematic view showing that the side electrode plates being combined with auxiliary electric conductors appear multi-pairs of electrode plates in the stacked structure.

For the electrode plate multi-end sides to single end side current collector of an electricity storage/discharge device of present invention, the electrode plates in the same polarity within the same electrode cell inside the casing (200) are further parallel connected;

FIG. 13 is a decomposed schematic view showing that the side electrode plates being combined with auxiliary electric conductors appear multi-pairs of electrode plates in the stacked structure.

Figure 14:
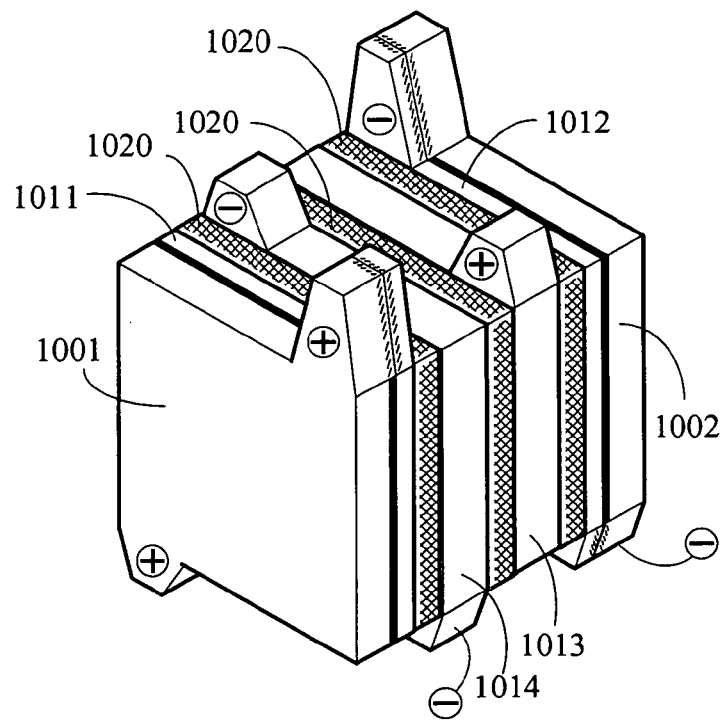
FIG. 14 is an assembly schematic view showing that the side electrode plates being combined with auxiliary electric conductors appear multi-pairs of electrode plates in the stacked structure.

FIG. 14 is an assembly schematic view showing that the side electrode plates being combined with auxiliary electric conductors appear multi-pairs of electrode plates in the stacked structure.

Figure 15:
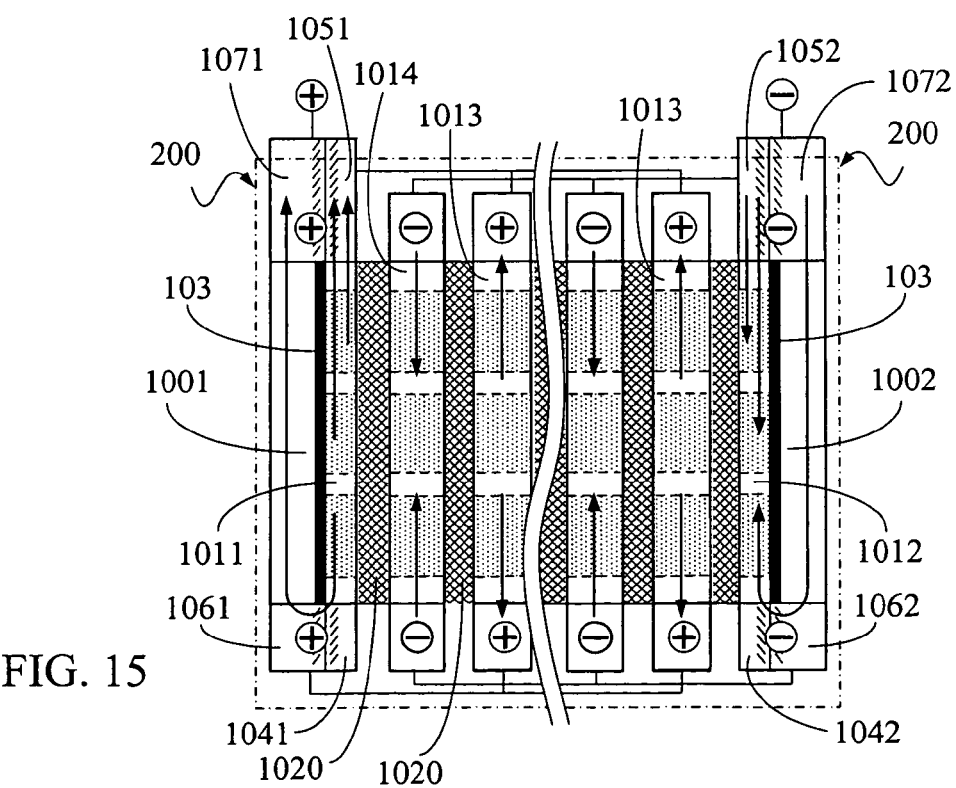
FIG. 15 shows that the side electrode plates being combined with auxiliary electric conductors are stacked inside electrode cells, wherein the current collecting terminals of the same polarity of the multi-pairs of electrode plates are in parallel connection.

FIG. 15 shows that the side electrode plates being combined with auxiliary electric conductors are stacked inside electrode cells, wherein the current collecting terminals of the same polarity of the multi-pairs of electrode plates are in parallel connection.

In the embodiments shown in FIGS. 13, 14 and 15, the side electrode plate (101) of the stack of electrode plates as shown in FIG. 4 are respectively made to the side positive electrode plate (1011) and the side negative electrode plate (1012), wherein the insulator (103) is interposed between the side positive electrode plate (1011) and the positive auxiliary electric conductor (1001), while the current collecting terminal (1041) of the side positive electrode plate (1011) and the current collecting terminal (1061) of the positive auxiliary electric conductor (1001) are parallel connected for electric conduction, as well as the input/output current collecting terminal (1051) of the side positive electrode plate (1011) and the input/output current collecting terminal (1071) of the positive auxiliary electric conductor (1001) are parallel connected for input/output currents to the outside;

The insulator (103) is interposed between the side negative electrode plate (1012) and the negative auxiliary electric conductor (1002), while the current collecting terminal (1042) of the side negative electrode plate (1012) and the current collecting terminal (1062) of the negative auxiliary electric conductor (1002) are parallel connected for electric conduction, as well as the input/output current collecting terminal (1052) of the side negative electrode plate (1012) and the input/output current collecting terminal (1072) of the negative auxiliary electric conductor (1002) are parallel connected for input/output currents to the outside;

The separator plates (1020) are respectively interposed between the side positive electrode plate (1011) and the neighboring middle negative electrode plate (1014), and between the middle negative electrode plate (1014) and the neighboring middle positive electrode plate (1013), as well as between the middle positive electrode plate (1013) and the neighboring side negative electrode plate (1012);

The current collecting terminals of aforesaid side positive electrode plate (1011) and aforesaid middle positive electrode plate (1013) on the same ends are parallel connected for electric conduction, and the current collecting terminals of the side negative electrode plate (1012) and the middle negative electrode plate (1014) are also parallel connected for electric conduction, wherein the number of middle positive electrode plates (1013) and middle negative electrode plates (1014) is one or more than one thereby constituting the structure of multiple pairs of electrode plates in parallel connection for electric conduction.

The joined surfaces of aforesaid side positive electrode plate (1011), side negative electrode plate (1012), middle positive electrode plate (1013), middle negative electrode plate (1014) for joining the separator plate (1020) has a lattice type space to install conventional active matter (102) used for generating electricity storage/discharge function.

The embodiments shown in FIGS. 13, 14, 15 are further constituted by that multiple independent or integrated electrode cells having multiple parallel connected electrode plates of the same polarity are series connected via the input/output terminals in different polarities for voltage selection.

Figure 16:
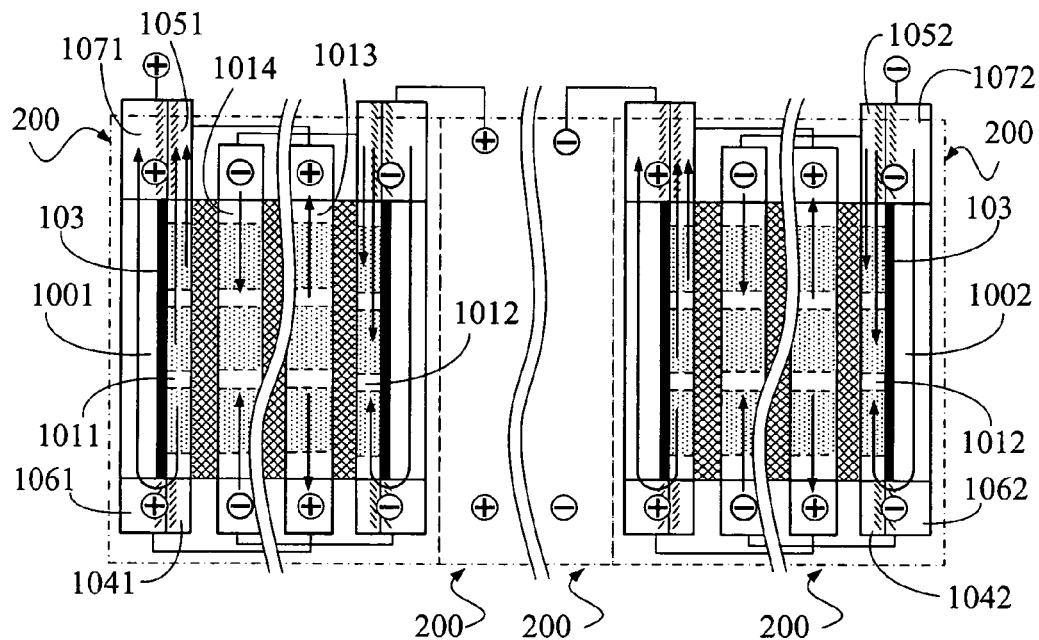
FIG. 16 shows the electric current flow path of that side electrode plates being combined with auxiliary electric conductors are stacked inside multiple electrode cells, wherein the current collecting terminals of the multi-pairs of electrode plates in the same polarity are in parallel connection, while the input/output current terminals of individual electrode cells are series connected in forward polarities outside the casing.

FIG. 16 shows the electric current flow path of that side electrode plates being combined with auxiliary electric conductors are stacked inside multiple electrode cells, wherein the current collecting terminals of the multi-pairs of electrode plates in the same polarity are in parallel connection, while the input/output current terminals of individual electrode cells are series connected in forward polarities outside the casing;

As shown in FIG. 16, it is constituted of that:

The electrode cells with individual casings (200) are arranged for individually housing a stack of electrode plates including housing the side positive electrode plate (1011) and the side negative electrode plate (1012), wherein:

The insulator (103) is interposed between the side positive electrode plate (1011) and the positive auxiliary electric conductor (1001) which are parallel connected via the positive input/output current collecting terminals (1071, 1051) thereof for electric conduction to provide input/output currents to the outside, and are parallel connected with the current collecting terminal (1081) of the middle positive electrode plate (1013) in the same electrode cell, while the current collecting terminals (1041, 1061) at the other side of the same electrode plate are parallel connected with the current collecting terminals (1081) of the middle positive electrode plate (1013) in the same electrode cell;

The insulator (103) is interposed between the side negative electrode plate (1012) and the negative auxiliary electric conductor (1002) which are parallel connected via the negative input/output current collecting terminals (1052, 1072) for electric conduction to provide input/output currents to the outside, and are parallel connected with the current collecting terminal (1091) of the middle negative electrode plate (1014) in the same electrode cell, while the current collecting terminals (1042, 1062) at the other side of the same side negative electrode plate (1012) are parallel connected with the current collecting terminals (1091) of the middle negative electrode plate (1014) in the same electrode cell, wherein the individual input/output current collecting terminals are externally exposed outside the casing (200) for series or parallel connection to provide input/output currents to the outside.

Figure 17:
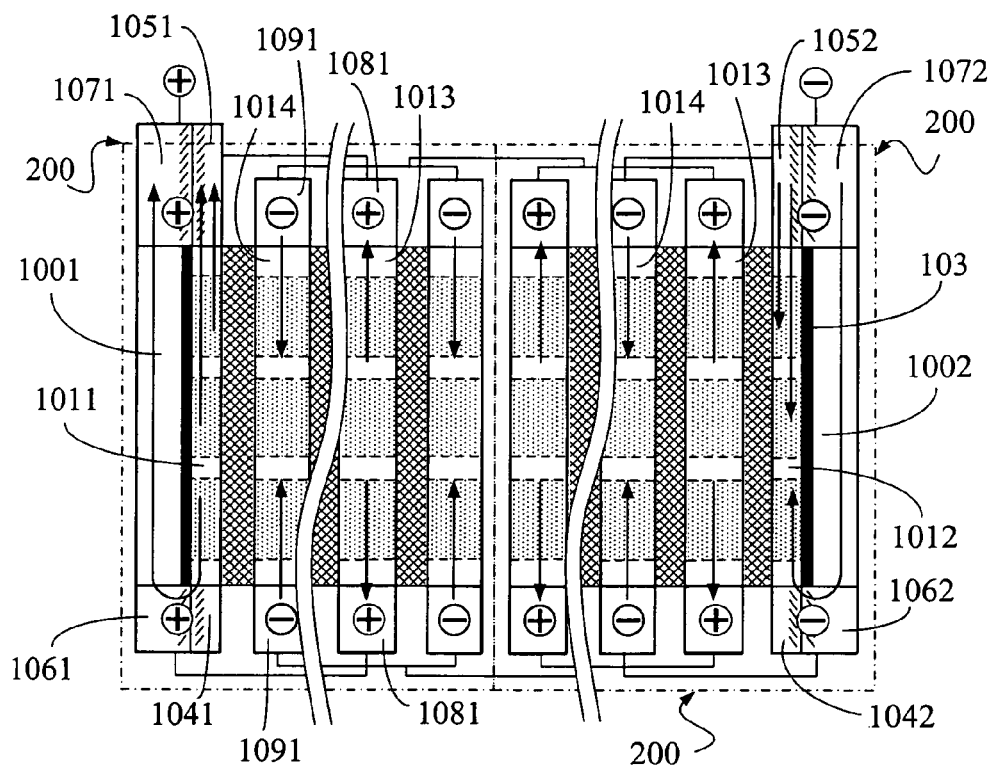
FIG. 17 shows the electric current path of that side electrode plates being combined with auxiliary electric conductors are stacked inside multiple electrode cells, wherein the current collecting terminals of the multi-pairs of electrode plates inside the multiple electrode cells are parallel connected, then the current collecting terminals of individual electrode cells are further series connected in forward polarities.

FIG. 17 shows the electric current path of that side electrode plates being combined with auxiliary electric conductors are stacked inside multiple electrode cells, wherein the current collecting terminals of the multi-pairs of electrode plates inside the multiple electrode cells are parallel connected, then the current collecting terminals of individual electrode cells are further series connected in forward polarities;

As shown in FIG. 17, it is constituted of that:

In the electrode cells in the integrated casing (200) for housing positive electrode input/output current collecting terminals, an insulator (103) is interposed between the side positive electrode plate (101.1) and the positive auxiliary electric conductor (1001), which are parallel connected via the positive input/output current collecting terminals (1071, 1051) for providing input/output currents to the outside, and are parallel connected with the middle positive electrode plate (1013) in the electrode cell;

In the electrode cell of integrated casing (200) for housing negative electrode input/output current collecting terminals, an insulator (103) is interposed between the side negative positive electrode plate (1012) and the negative auxiliary electric conductor (1002) which are parallel connected via the negative electrode input/output current collecting terminals (1072, 1052) for providing input/output currents to the outside, and are parallel connected with the middle negative electrode plate (1014) in the electrode cell;

As shown in aforesaid FIG. 17, it is constructed by that the side positive electrode plate (1011) and the side negative electrode plate (1012) are respectively installed on the end sides of their individually belonging electrode cells of the integrated casing (200), while besides the side positive electrode plate (1011) and the middle negative electrode plate (1014), at least one middle positive electrode plate (1013) and one middle negative electrode plate (1014) in positive-negative polarity order shall be installed in the electrode cell, as well as the side negative electrode plate (1012) and the middle positive electrode plate (1013) are installed in another electrode cell, and at least one middle positive electrode plate (1013) and one middle negative electrode plate (1014) in positive-negative polarity order shall be installed in another electrode cell, wherein the current collecting terminals (1041, 1051) at the two end-sides of the side positive electrode plate (1011), the current collecting terminals (1061, 1071) at the two end-sides of the positive auxiliary electric conductor (1001), and the current collecting terminals (1081) at the two end-sides of the middle positive electrode plate (1013) of the same polarity in the same electrode cell are parallel connected, and the current collecting terminals (1042, 1052) at the two sides of the side negative electrode plate (1012), the current collecting terminals (1062, 1072) at the two end-sides of the negative auxiliary electric conductor (1002), and the current collecting terminals (1091) at the two end-sides of the middle negative electrode plate (1014) of the same polarity in another electrode cell are parallel connected; wherein respective current collecting terminals at the two end-sides of the middle positive electrode plate (1013) and at the two end-sides of the middle negative electrode plate (1014) of neighboring electrode cells in different polarities are series connected for electric conduction.

Figure 18:
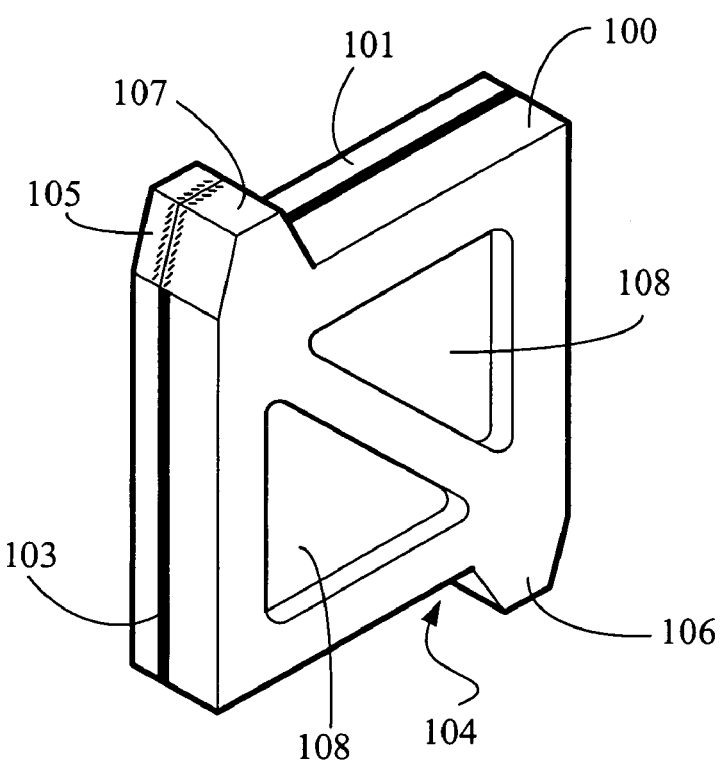
FIG. 18 is a perspective structural schematic view of the present invention showing that an insulator is interposed between the side electrode plate being made with a current collecting terminal respectively at the two end-sides thereof and the flat plate type auxiliary electric conductor with weight reducing concave holes being respectively made with a current collecting terminal at the two end-sides thereof.
Figure 19:
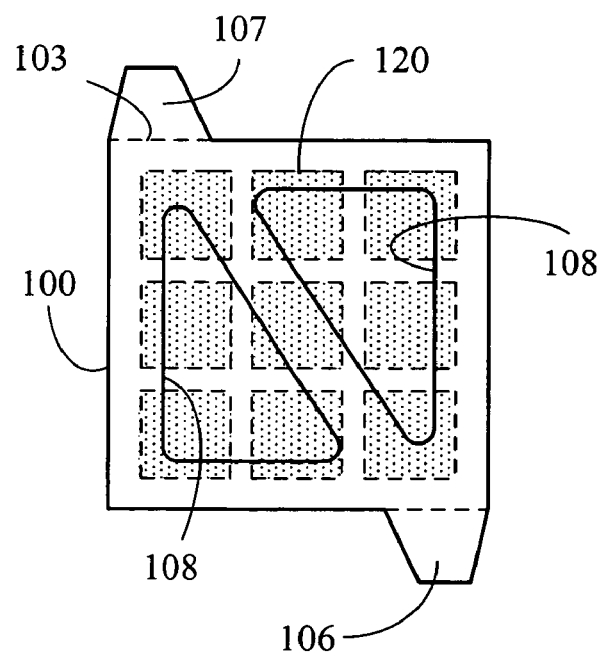
FIG. 19 is the front view of FIG. 18.
Figure 20:
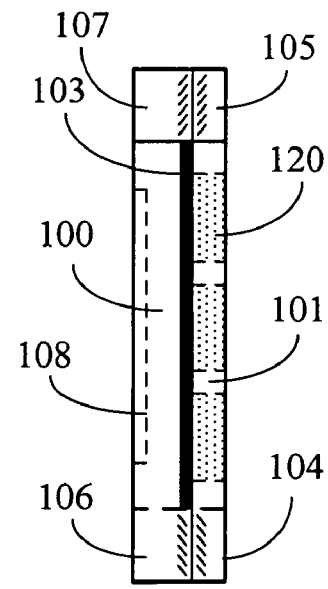
FIG. 20 is the side view of FIG. 18.

The auxiliary electric conductor (100) including the positive auxiliary electric conductor (1001) and the negative auxiliary electric conductor (1002) of the electrode plate multi-end sides to single end side current collector of an electricity storage/discharge device of the present invention are optionally selectively made to following one or more than one geometric shapes of electrode plate structure on the condition for favorable current transmission; including:

1) As shown in FIG. 18 is a perspective structural schematic view of the present invention showing that an insulator is interposed between the side electrode plate being made with a current collecting terminal respectively at the two end-sides thereof and the flat plate type auxiliary electric conductor with weight reducing concave holes being respectively made with a current collecting terminal at the two end-sides thereof;

FIG. 19 is the front view of FIG. 18;

FIG. 20 is the side view of FIG. 18.

As shown in FIG. 18, FIG. 19 and FIG. 20, it is constructed by that the insulator (103) is interposed between the side electrode plate (101) being made with an external input/output current collecting terminal (105) at one end side thereof and a current collecting terminal (104) at the other end side thereof; and the flat plate type auxiliary electric conductor (100) with weight reducing concave holes (108) being made with an external input/output current collecting terminal (107) thereof and a current collecting terminal (106) at the other end side thereof, wherein the external input/output current collecting terminals (105, 107) and the current collecting terminals (104, 106) on the same sides of the side electrode plate (101) and the auxiliary electric conductor (100) are respectively parallel connected for electric conduction.

2) As shown in FIG. 21 is a perspective structural schematic view of the present invention showing that an insulator is interposed between the side electrode plate being made with two current collecting terminals respectively at the two end-sides thereof and the flat plate type auxiliary electric conductor being respectively made with two current collecting terminals at the two end-sides thereof;

FIG. 22 is the front view of FIG. 21;

FIG. 23 is the side view of FIG. 21.

As shown in aforesaid FIG. 21, FIG. 22 and FIG. 23, it is constructed by that the insulator (103) is interposed between the side electrode plate (101) being made with two external input/output current collecting terminals (105) and two current collecting terminals (104) respectively at the two end-sides thereof, and the flat plate type auxiliary electric conductor (100) being made with two external input/output current collecting terminals (107) and two current collecting terminals (106) respectively at the two end-sides thereof, wherein the current collecting terminals on the same sides of the side electrode plate (101) and the auxiliary electric conductor (100) are parallel connected thereby allowing the two connected current collecting terminals for input/output currents on the same end side either being further parallel connected for electric conduction to provide input/output currents to the outside, or not being parallel connected but provide input/output currents to the outside individually.

3) As shown in FIG. 24 is a perspective structural schematic view of the present invention showing that an insulator is interposed between the side electrode plate being made with two current collecting terminals respectively at the two end-sides thereof and the flat plate type auxiliary electric conductor with weight reducing concave holes being respectively made with two current collecting terminals at the two end-sides thereof;

FIG. 25 is the front view of FIG. 24;

FIG. 26 is the side view of FIG. 24.

As shown in aforesaid FIG. 24, FIG. 25 and FIG. 26, it is constructed by that the insulator (103) is interposed between the side electrode plate (101) being made with two external input/output current collecting terminals (105) and two current collecting terminals (104) respectively at the two end-sides thereof, and the flat plate type auxiliary electric conductor (100) with weight reducing concave holes (108) being made with two external input/output current collecting terminals (107) and two current collecting terminals (106) respectively at the two end-sides thereof, wherein the current collecting terminals on the same sides of the side electrode plate (101) and the auxiliary electric conductor (100) are parallel connected thereby allowing the connected current collecting terminals for input/output currents on the same end side either being further parallel connected for electric conduction to provide input/output currents to the outside, or not being parallel connected but provide input/output currents to the outside individually.

Figure 27:
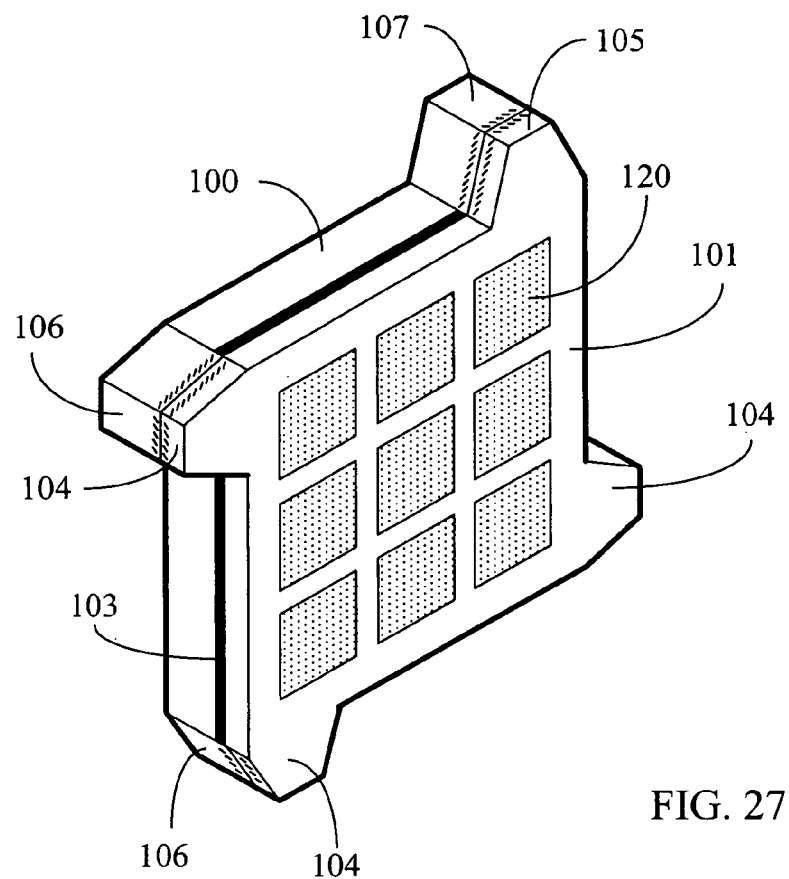
FIG. 27 is a perspective structural schematic view of the present invention showing that an insulator is interposed between the side electrode plate being made with a current collecting terminal respectively at the four end-sides thereof and the flat plate type auxiliary electric conductor being respectively made with a current collecting terminal at the four end-sides thereof.
Figures 28, 29:
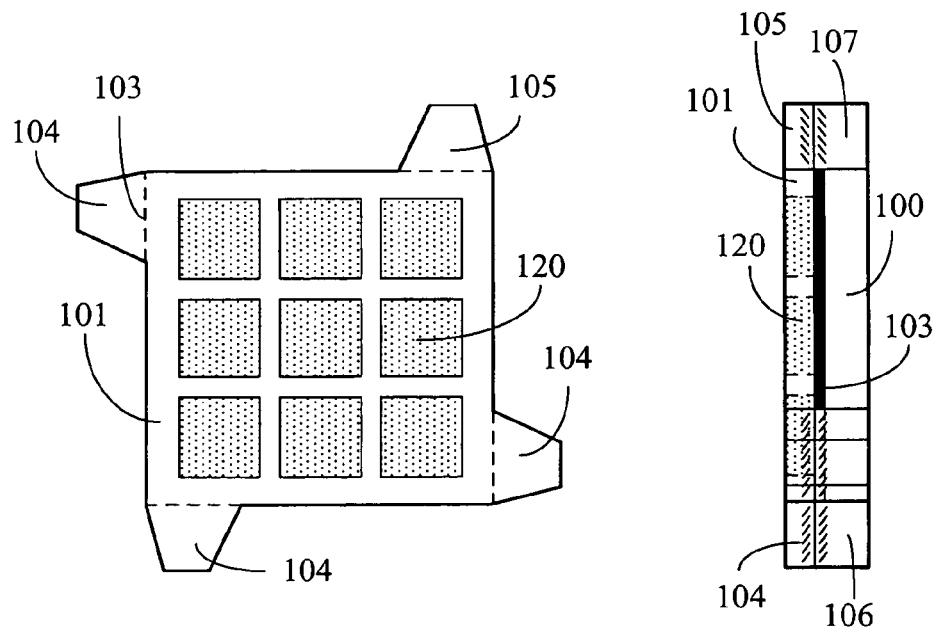
FIG. 28 is the front view of FIG. 27.
FIG. 29 is the side view of FIG. 27.

4) As shown in FIG. 27 is a perspective structural schematic view of the present invention showing that an insulator is interposed between the side electrode plate being made with a current collecting terminal respectively at the four end-sides thereof and the flat plate type auxiliary electric conductor being respectively made with a current collecting terminal at the four end-sides thereof;

FIG. 28 is the front view of FIG. 27.

FIG. 29 is the side view of FIG. 27.

As shown in aforesaid FIG. 27, FIG. 28 and FIG. 29, it is constructed by that the insulator (103) is interposed between the side electrode plate (101) being made with a current collecting terminal respectively at the four end-sides thereof, and the flat plate type auxiliary electric conductor (100) being respectively made with a current collecting terminal at the four end-sides thereof, wherein the current collecting terminals on the same sides of the side electrode plate (101) and the auxiliary electric conductor (100) are respectively parallel connected thereby allowing the connected current collecting terminals for input/output current at the respective same end sides being further parallel connected for electric conduction to provide input/output currents to the outside.

5) As shown in FIG. 30 is a perspective structural schematic view of the present invention showing that an insulator is interposed between the side electrode plate being made with a current collecting terminal respectively at the four end-sides thereof and the flat plate type auxiliary electric conductor with weight reducing concave holes being respectively made with a current collecting terminals at the four end-sides thereof;

FIG. 31 is the front view of FIG. 30;

FIG. 32 is the side view of FIG. 30.

As shown in aforesaid FIG. 30, FIG. 31 and FIG. 32, it is constructed by that the insulator (103) is interposed between the side electrode plate (101) being made with a current collecting terminal respectively at the four end-sides thereof, and the flat plate type auxiliary electric conductor (100) with weight reducing concave holes (108) being respectively made with a current collecting terminals at the four end-sides thereof, wherein the current collecting terminals one the same sides of the side electrode plate (101) and the auxiliary electric conductor (100) are respectively parallel connected thereby allowing the connected current collecting terminals for input/output current at the respective same end sides being further parallel connected for electric conduction to provide input/output currents to the outside.

Figure 33:
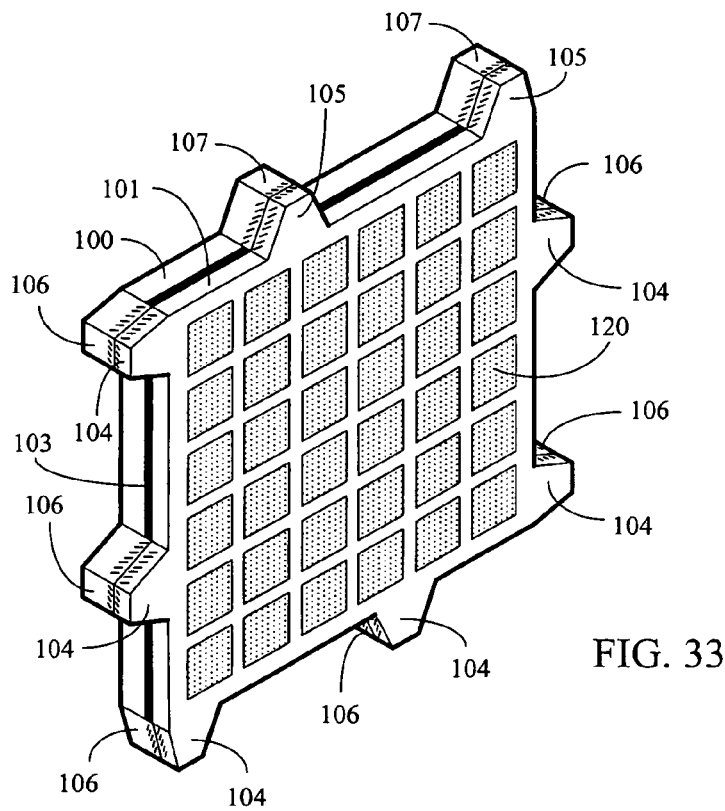
FIG. 33 is a perspective structural schematic view of the present invention showing that an insulator is interposed between the side electrode plate being made with two current collecting terminals respectively at the four end-sides thereof and the flat plate type auxiliary electric conductor being respectively made with two current collecting terminals at the four end-sides thereof.
Figure 34:
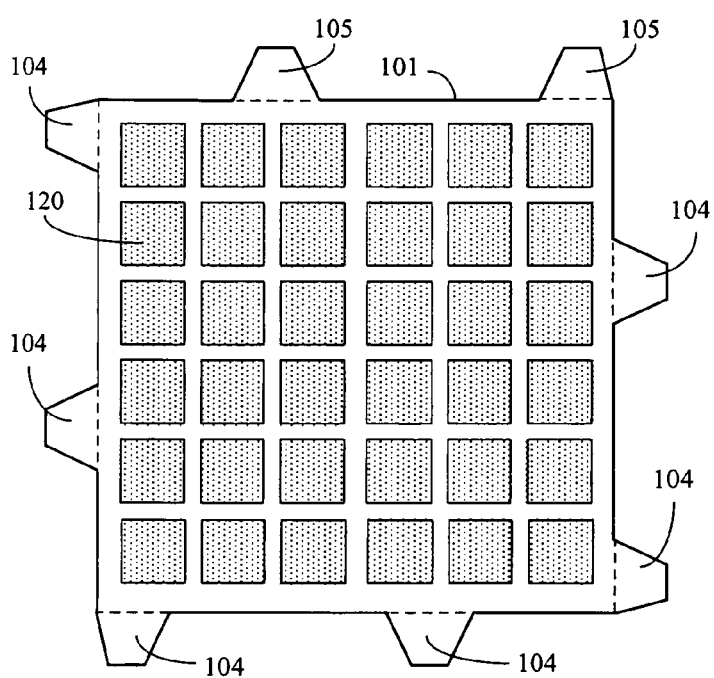
FIG. 34 is the front view of FIG. 33.
Figure 35:
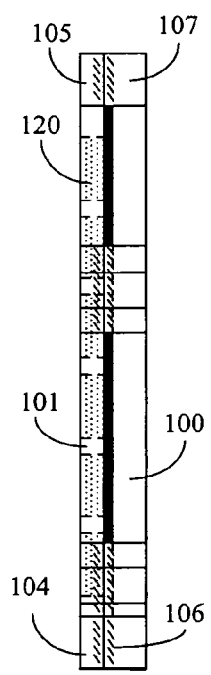
FIG. 35 is the side view of FIG. 33.

6) As shown in FIG. 33 is a perspective structural schematic view of the present invention showing that an insulator is interposed between the side electrode plate being made with two current collecting terminals respectively at the four end-sides thereof and the flat plate type auxiliary electric conductor being respectively made with two current collecting terminals at the four end-sides thereof;

FIG. 34 is the front view of FIG. 33;

FIG. 35 is the side view of FIG. 33.

As shown in aforesaid FIG. 33, FIG. 34 and FIG. 35, it is constructed by that the insulator (103) is interposed between the side electrode plate (101) being made with two current collecting terminals respectively at the four end-sides thereof, and the flat plate type auxiliary electric conductor (100) being respectively made with two current collecting terminals at the four end-sides thereof, wherein the current collecting terminals on the same sides of the side electrode plate (101) and the auxiliary electric conductor (100) are respectively parallel connected thereby allowing the connected current collecting terminals for input/output current at the respective same end sides being either further parallel connected for electric conduction to provide input/output current to the outside, or individually used to provide input/output currents to the outside.

7) As shown in FIG. 36 is a perspective structural schematic view of the present invention showing that an insulator is interposed between the side electrode plate being made with two current collecting terminals respectively at the four end-sides thereof and the flat plate type auxiliary electric conductor with weight reducing concave holes being respectively made with two current collecting terminals at the four end-sides thereof;

FIG. 37 is the front view of FIG. 36;

FIG. 38 is the side view of FIG. 36.

As shown in aforesaid FIG. 36, FIG. 37 and FIG. 38, it is constructed by that the insulator (103) is interposed between the side electrode plate (101) being made with two current collecting terminals respectively at the four end-sides thereof, and the flat plate type auxiliary electric conductor (100) with weight reducing concave holes (108) being respectively made with two current collecting terminal at the four end-sides thereof, wherein the current collecting terminals on the same sides of the side electrode plate (101) and the auxiliary electric conductor (100) are respectively parallel connected thereby allowing the connected current collecting terminals for input/output current at the respective same end sides being either further parallel connected for electric conduction to provide input/output current to the outside, or individually used to provide input/output currents to the outside.

The above described embodiments 1)~7) are simply structural application examples which are not used for limitations, i.e. the auxiliary electric conductor (100) including the positive auxiliary electric conductor (1001) and the negative auxiliary electric conductor (1002) of the electrode plate multi-end sides to single end side current collector of an electricity storage/discharge device of the present invention is optionally selectively made to one or more than one geometric shapes as needed on the condition of favorable current transmission.

Figure 39:
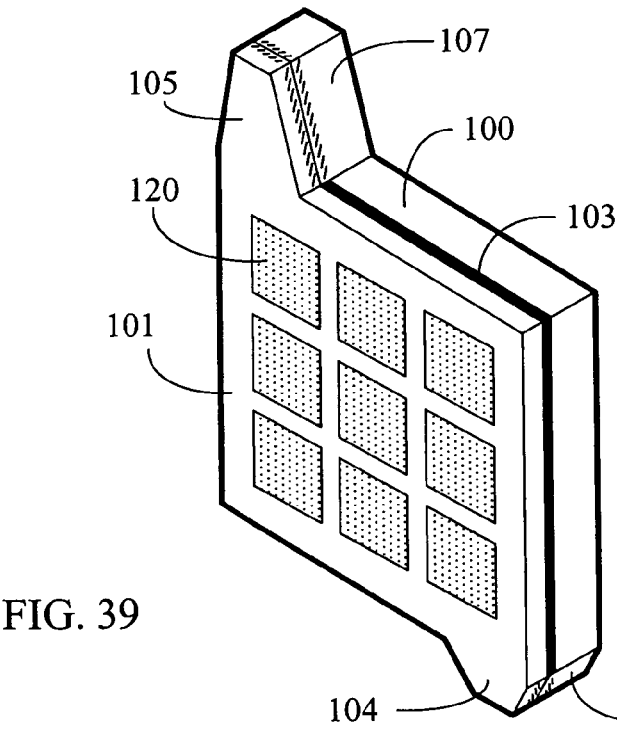
FIG. 39 is a structural schematic view of the embodiment showing that the neighborhood near to the input/output current collecting terminal at the electrode plate of the present invention is outwardly slantingly widened thereby forming the electrode plate structure comprising mesh type conductor having gradually increased effective current transmission area.
Figure 40:
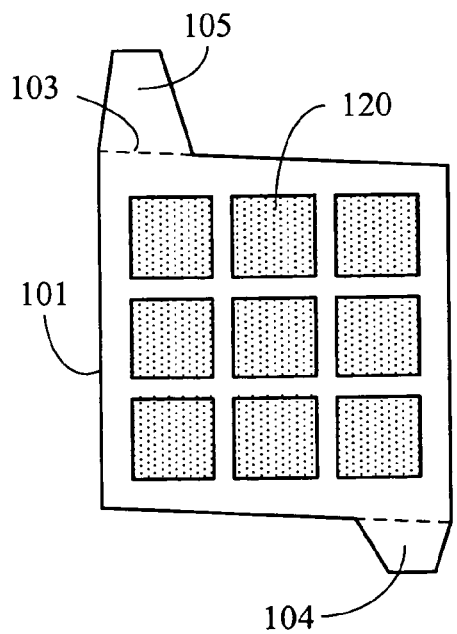
FIG. 40 is the front view of FIG. 39.
Figure 41:
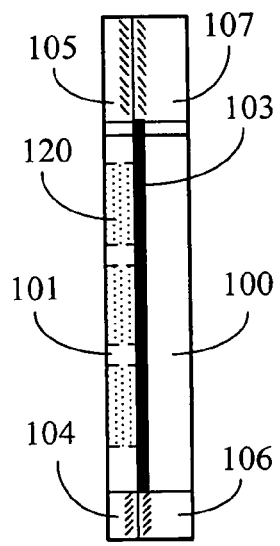
FIG. 41 is the side view of FIG. 39.
Figure 42:
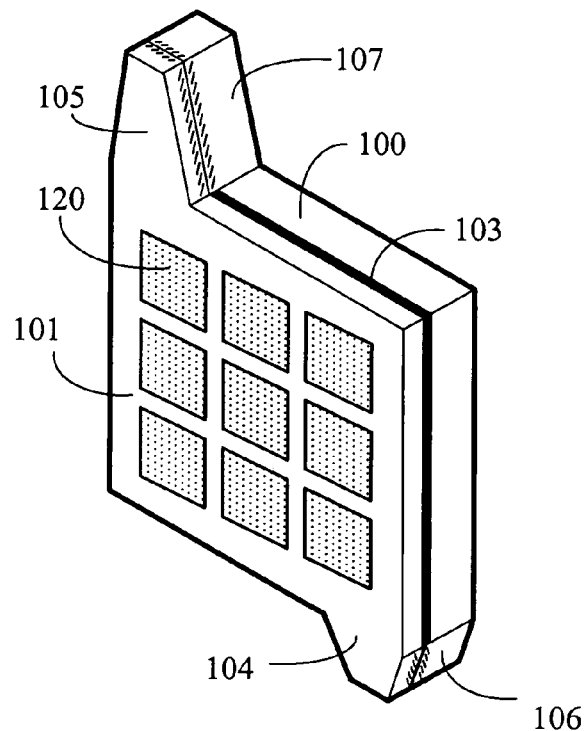
FIG. 42 is a structural schematic view of the embodiment showing that the space of the electrode plate of the present invention for installing active matter (120) used for generating electricity storage/discharge function is in a lattice shape and slants to the frame of the mesh-lattice type current collecting conductor at outer side of the electrode plate, so as to allow the neighborhood near to the input/output current collecting terminal to be outwardly slantingly widened thereby forming the mesh type conductor having gradually increased effective current transmission area at locations nearer to the input/output current collecting terminals.
Figure 43:
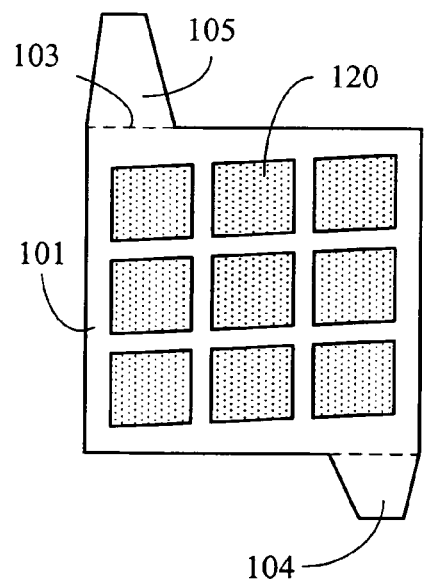
FIG. 43 is the front view of FIG. 42.
Figure 44:
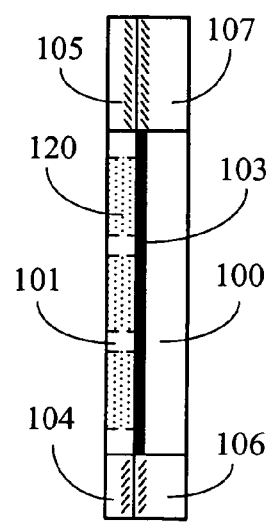
FIG. 44 is the side view of FIG. 42.

Besides, for enhancing the electrode plate current collecting function of the current collecting terminals (T100) installed on all or partial electrode plates, including for enhancing the electrode plate current collecting function of the current collecting terminals (T100) installed on the side electrode plate (101), the side positive electrode plate (1011), the side negative electrode plate (1012), the middle positive electrode plate (1013), or the middle negative electrode plate (1014), the lattice shape space for installing active matter (120) with electricity storage/discharge function on aforesaid all or partial electrode plates and the electric conducting structure at outside frame of electrode plates have larger effective electric conducting area at the location nearer to the input/output current collecting terminal (T100), thereby reducing the impedance and favoring the uniformed transmission of current density;

FIG. 39 is a structural schematic view of the embodiment showing that the neighborhood near to the input/output current collecting terminal at the electrode plate of the present invention is outwardly slantingly widened thereby forming the electrode plate structure comprising current collecting conductor having gradually increased effective current transmission area;

FIG. 40 is the front view of FIG. 39;

FIG. 41 is the side view of FIG. 39;

As shown in aforesaid FIG. 39, FIG. 40 and FIG. 41, for enhancing the electrode plate current collecting function of the current collecting terminals (T100) installed on all or partial electrode plates, including for enhancing the electrode plate current collecting function of the current collecting terminals (T100) installed on the side electrode plate (101), the side positive electrode plate (1011), the side negative electrode plate (1012), the middle positive electrode plate (1013), or the middle negative electrode plate (1014), the electric conducting structure at outside frame of said all or partial electrode plates at neighborhood nearer to the input/output current collecting terminals (T100) have larger effective electric conducting cross-sectional area, wherein the structural characteristic includes outwardly slantingly gradually widened, or gradually thicker, or both gradually widen and thicker, thereby forming the structure of current collecting conductor to have more gradually increased effective current transmission area at locations nearer to the input/output current terminals;

Based on the same rationale, said structure for enhancing the electrode plate current collecting function of current collecting terminals further includes the electrode plates being applied in conventional electricity storage device comprising electricity storage/discharge device of conventional primary battery, secondary chargeable/dischargeable battery, capacitors, or super-capacitors, or fuel cell power supply device having electrode plates;

Further, FIG. 42 is a structural schematic view of the embodiment showing that at where between the lattice shape space of the electrode plate of the present invention for installing the active matter (120) with electricity storage/discharge function and the outside mesh type current collecting conductor at outside frame of electrode plate appears a slanted mesh-lattice shape structure, so as to allow the neighborhood near to the input/output current collecting terminal to be outwardly slantingly widened thereby forming the mesh type conductor having gradually increased effective current transmission area at locations nearer to the input/output current collecting terminals;

FIG. 43 is the front view of FIG. 42;

FIG. 44 is the side view of FIG. 42;

As shown in aforesaid FIG. 42, FIG. 43 and FIG. 44, for enhancing the electrode plate current collecting function of the current collecting terminals (T100) installed on all or partial electrode plates, including for enhancing the electrode plate current collecting function of the current collecting terminals (T100) installed on the side electrode plate (101), the side positive electrode plate (1011), the side negative electrode plate (1012), the middle positive electrode plate (1013), or the middle negative electrode plate (1014), at where between the lattice shape space of aforesaid all or partial electrode plates for installing active matter (120) used for generating electricity storage/discharge function and the mesh shape current collecting electric conductor of the electrode plate appears in a slanted mesh-lattice shape structure, so as to allow the neighborhood nearer to the input/output current collecting terminal of the electric conducting structure at outside frame of the electrode plate to be outwardly slantingly gradually widened, or gradually thicker, or both gradually widen and thicker, so that to increase effective current transmission area thereby forming the mesh type current collecting conducting structure to have more gradually increased effective current transmission area at neighborhood nearer to the input/output current terminals, and thereby forming the non-parallel slanted multi-lattice type structural relationship between the lattice type space of active matter (120) used for generating electricity storage/discharge function and the frame of outer side mesh type electric conductor.

Based on the same rationale, said structure for enhancing the electrode plate current collecting function of current collecting terminals further includes the electrode plates being applied in conventional electricity storage device comprising electricity storage/discharge device of conventional primary battery, secondary chargeable/dischargeable battery, capacitors, or super-capacitors, or fuel cell power supply device having electrode plates.

The invention claimed is:

1. An electrode plate assembly for an electricity storage/discharge device, comprising:
an electrode plate having a generally planar surface and a plurality of sides at edges of said generally planar surface, said electrode plate having least one input/output current-collecting first terminal structure on a first of said sides of the electrode plate and at least one current-collecting second terminal structure on a second of said sides of the electrode plate, the first side being opposite the second side;

an auxiliary electric conductor; and an insulator portioned between the electrode plate and the auxiliary electric conductor, wherein said at least one input/output current-collecting first terminal structure has a same polarity as said at least one current-collecting second terminal structure, and wherein said auxiliary electric conductor electrically connects at least one first terminal structure and said at least one second terminal structure at opposites of the electrode plate to provide an auxiliary current path for charges collected by the respective first and second terminal structures.

2. An electrode plate assembly as claimed in claim 1, wherein the auxiliary conductor has one of the following shapes or configurations: a flat plate; a bar, multiple bars; a flat plate with concave holes, through holes, or blind holes; and a mesh structure.

3. An electrode plate assembly as claimed in claim 1, wherein said auxiliary electric conductor also includes first and second terminal structures at opposite sides of the auxiliary electric conductor, said first and second terminal structures of the auxiliary electric conductor corresponding to respective said first and second terminal structures of the electrode plate.

4. An electrode plate assembly as claimed in claim 3, wherein said first and second terminal structures of the auxiliary electric conductor are joined to the respective said first and second terminals structures of the electrode plate by one of the following joining methods: welding, fusion joining, rivet fastening, screwing, and application of pressure by pre-stressing or embedding.

5. An electrode plate assembly as claimed in claim 1, wherein said auxiliary electric conductor and insulator are joined to said planar surface of the electrode plate, and wherein a second planar surface of the electrode plate that faces away from said auxiliary electric conductor and insulator has a lattice structure with spaces for an active material to provide an electricity storage/discharge function.

6. An electrode plate assembly as claimed in claim 1, wherein said auxiliary electric conductor includes a plurality of weight-reducing concave holes.

7. An electrode plate assembly as claimed in claim 1, wherein said first terminal structure extends outwardly in a first direction from the electrode plate and said second terminal extends outwardly in a second direction opposite said first direction.

8. An electrode plate assembly as claimed in claim 1, further comprising at least one third terminal structure and at least one fourth terminal structure, said at least one third terminal structure and said at least one fourth terminal structure extending from mutually opposite sides of said electrode plate that are transverse to said opposite sides from which said first and second terminal structures extend.

9. An electrode plate assembly as claimed in claim 1, wherein said electricity storage/discharge device is one of a primary battery, secondary rechargeable battery, capacitor, super-capacitor, and fuel cell power supply device.

10. An electrode plate assembly as claimed in claim 1, further comprising a second said electrode plate, auxiliary electric conductor, and insulator, wherein said first electrode plate, auxiliary electric conductor, and insulator form a first end unit of the storage/discharge device and said second electrode plate, auxiliary electrode plate, and insulator for a second end unit of the storage/discharge device, said first and second end units having opposite polarities, and said auxiliary electric conductors facing away from each other.

11. An electrode plate assembly as claimed in claim 10, wherein said electrode plates of said first and second end units face each other and are separated by an isolating plate.

12. An electrode plate assembly as claimed in claim 10, further comprising a plurality of additional electrode plates of alternating polarity between said first and second end units to form a stacked storage/discharge device.

13. An electrode plate assembly as claimed in claim 12, wherein opposite-polarity pairs of said additional electrode plates are electrically connected to form individual cells of said storage/discharge device.

14. An electrode plate assembly as claimed in claim 13, wherein a number of said opposite-polarity pairs is one, and said opposite-polarity pairs are separated from said first and second electrode plates of said end units by respective isolating plates.

15. An electrode plate assembly as claimed in claim 13, wherein a number of said opposite-polarity pairs is at least two, and said opposite-polarity pairs are separated from each other and from the end units by respective isolating plates.

16. An electrode plate assembly as claimed in claim 13, wherein each of said additional electrode plates include additional terminal structures extending from opposite sides of said electrode plates, and further comprising conductors for connecting terminal structures of same polarity to each other.

17. An electrode plate assembly as claimed in claim 13, wherein each of said additional electrode plates includes holes filled with an active material to provide an electricity storage/discharge function.

18. An electrode plate assembly as claimed in claim 13, wherein said individual cells are housed in individual casings, said individual casings serving as isolating structures between said cells.

19. An electrode plate assembly as claimed in claim 13, wherein all of said additional electrode plates and said end units are housed in a common casing.

20. An electrode plate assembly as claimed in claim 19, wherein isolating structures between said individual cells are integral with said common casing.

21. An electrode plate assembly as claimed in claim 12, wherein said input/output current-collecting first terminal structures of said end units form positive and negative terminals of said storage discharge device.

* * * * *